(12) United States Patent
Suh et al.

US008823772B2

(10) Patent No.: US 8,823,772 B2
(45) Date of Patent: Sep. 2, 2014

(54) DIGITAL BROADCASTING RECEPTION METHOD CAPABLE OF DISPLAYING STEREOSCOPIC IMAGE, AND DIGITAL BROADCASTING RECEPTION APPARATUS USING THE SAME

(75) Inventors: Jong-Yeul Suh, Seoul (KR); Jeong-Hyu Yang, Seoul (KR); Ho-Taek Hong, Seoul (KR); Joon-Hui Lee, Seoul (KR); Jin-Pil Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 246 days.

(21) Appl. No.: 13/133,291

(22) PCT Filed: Jun. 26, 2009

(86) PCT No.: PCT/KR2009/003481
§ 371 (c)(1),
(2), (4) Date: Jun. 7, 2011

(87) PCT Pub. No.: WO2010/071283
PCT Pub. Date: Jun. 24, 2010

(65) Prior Publication Data
US 2011/0234755 A1     Sep. 29, 2011

Related U.S. Application Data

(60) Provisional application No. 61/138,939, filed on Dec. 18, 2008, provisional application No. 61/139,623, filed on Dec. 21, 2008.

(51) Int. Cl.
*H04N 13/00* (2006.01)
*H04N 7/32* (2006.01)
*H04H 40/18* (2008.01)

(52) U.S. Cl.
CPC ........... *H04N 13/0007* (2013.01); *H04N 13/00* (2013.01); *A63F 2300/105* (2013.01); *A63F 2300/204* (2013.01); *A63F 2300/8047* (2013.01); *H04H 40/18* (2013.01); *H04N 13/0059* (2013.01); *H04N 13/0066* (2013.01); *H04N 19/00769* (2013.01)
USPC .......................... 348/43; 725/240.01; 348/42

(58) Field of Classification Search
CPC .................... H04N 13/0055; H04N 19/00769; H04N 13/0239; H04N 13/0059; H04N 13/0048; H04N 13/0296; H04N 13/0497; H04N 13/0242; H04N 2013/0081; H04N 11/04; H04N 11/02; H04N 7/12; H04N 7/025; H04N 7/16; H04N 5/445; G06T 7/0075; G06T 2207/10012; G06T 7/0022; G02B 27/2214; G06K 9/36; H04H 9/00; G06F 13/00; G06F 3/00
USPC ................ 348/43, 51, 46, E13.062, E13.001, 348/E13.075, E13.026, E13.06, 723; 382/154; 386/95, 126, 124, E05; 375/240.01, 240.12; 725/118, 126, 725/105, 38, 9, 44, 45, 46, 47, 32, 135
See application file for complete search history.

(56) References Cited

U.S. PATENT DOCUMENTS

| | | | | |
|---|---|---|---|---|
| 5,745,645 | A * | 4/1998 | Nakamura et al. | 386/233 |
| 2002/0009137 | A1 * | 1/2002 | Nelson et al. | 375/240.1 |
| 2005/0166244 | A1 * | 7/2005 | Moon | 725/95 |
| 2006/0133493 | A1 * | 6/2006 | Cho et al. | 375/240.16 |
| 2006/0285011 | A1 * | 12/2006 | Yun | 348/465 |
| 2007/0223582 | A1 * | 9/2007 | Borer | 375/240.12 |
| 2007/0266407 | A1 * | 11/2007 | Yum | 725/58 |
| 2007/0279494 | A1 * | 12/2007 | Aman et al. | 348/169 |
| 2007/0283408 | A1 * | 12/2007 | Lee | 725/135 |
| 2007/0296864 | A1 * | 12/2007 | Kim | 348/564 |
| 2008/0019673 | A1 | 1/2008 | Hamasaka et al. | |
| 2008/0066142 | A1 * | 3/2008 | Kim | 725/141 |
| 2008/0143823 | A1 | 6/2008 | Jin et al. | |
| 2008/0310499 | A1 * | 12/2008 | Kim et al. | 375/240.01 |

| | | | |
|---|---|---|---|
| 2009/0029670 | A1* | 1/2009 | Cho et al. ............... 455/344 |
| 2009/0257452 | A1* | 10/2009 | Lee et al. ............... 370/476 |
| 2010/0110162 | A1* | 5/2010 | Yun et al. ............... 348/42 |

FOREIGN PATENT DOCUMENTS

| | | |
|---|---|---|
| CN | 1954606 A | 4/2004 |
| CN | 1642261 A | 7/2005 |
| CN | 101064799 A | 10/2007 |
| CN | 101064802 A | 10/2007 |
| CN | 101282471 A | 10/2008 |
| EP | 1 501 318 A1 | 1/2005 |
| JP | 2007-013994 | 1/2007 |
| KR | 10-2006-0054872 A | 5/2006 |
| KR | 100697972 A | 5/2006 |
| KR | 10-2006-0127308 A | 12/2006 |
| KR | 10-2007-0058302 A | 6/2007 |
| KR | 10-2008-0030360 A | 4/2008 |
| KR | 10-2008-0051086 A | 6/2008 |
| WO | 2007064159 A1 | 6/2007 |

OTHER PUBLICATIONS

ATSC-PSIP Standards Document_a_65-2009.*
Service Information in Digital Television Broadcasting, Jiang Xiuhua, Journal of Beijing Broadcasting Institute, Natural Science, vol. 9, Ed. 2, pp. 36-45.

* cited by examiner

*Primary Examiner* — Dave Czekaj
*Assistant Examiner* — Dramos I Kalapodas
(74) *Attorney, Agent, or Firm* — McKenna Long & Aldridge

(57) ABSTRACT

A digital broadcast receiving apparatus for displaying a stereoscopic image comprises: a demultiplexing unit configured to demultiplex a received digital broadcast signal; a PSIP or PSI/SI processor configured to extract extension view video information from the demultiplexed digital broadcast signal; a decoder configured to decode an extension view video stream and a base view video stream from the demultiplexed digital broadcast signal; and an output formatting unit configured to format the extension view video stream and the base view video stream based on the extension view video information. The extension view video information may include at least any one of a relative position relationship between a camera which has generated the extension view video stream and a camera which has generated the base view video stream, the number of the extension view video streams, and information regarding an arrangement structure of the cameras. The relative position relationship may include at least any one of the direction in which the camera, which has generated the extension view video stream, is positioned and the degree of separation in the direction based on the camera which has generated the base view video stream. Accordingly, a signal for a stereoscopic image in a digital broadcast can be checked and processed, so a stereoscopic image can be displayed.

19 Claims, 24 Drawing Sheets

Fig. 1
(a)
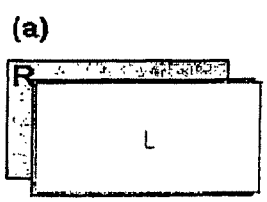
(b)
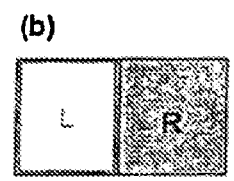
(c)
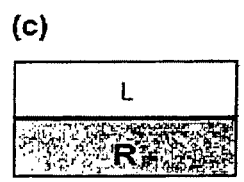
(d)
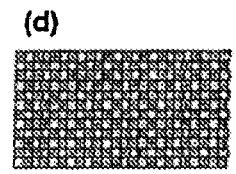

Fig. 2

| Syntax | No. of bits | Format |
|---|---|---|
| extended_view_descriptor () { | | |
|    descriptor_tag | 8 | 0xTBD |
|    descriptor_length | 8 | uimsbf |
|    reserved | 3 | '111' |
|    PCR_PID | 13 | uimsbf |
|    reserved | 5 | '11111' |
|    number_of_extended_views | 10 | uimsbf |
|    one_dimension_camera_setting_flag | 1 | bslbf |
|    for (i=0; i<number_of_extended_views; i++) { | | |
|       stream_type | 8 | uimsbf |
|       reserved | 3 | '111' |
|       elementary_PID | 13 | uimsbf |
|       left_right_pos | 2 | uimsbf |
|       if (number_of_extended_views > 1 || left_right_pos !=0 ) { | | |
|          view_position_hor | 6 | uimsbf |
|       } | | |
|       else { | | |
|          reserved | 6 | '111111' |
|       } | | |
|       if (one_dimension_camera_setting_flag == 0) { | | |
|          up_down_pos | 2 | uimsbf |
|          if (number_of_extended_views > 1 || up_down_pos!=0) { | | |
|             view_position_ver | 6 | uimsbf |
|          } | | |
|          else { | | |
|             reserved | 6 | '111111' |
|          } | | |
|       } | | |
|       else | | |
|          reserved | 8 | '11111111' |
|    } | | |
| } | | |

FIG. 3

| Syntax | No.of Bits | Format |
|---|---|---|
| terrestrial_virtual_channel_table_section(){ | | |
|   table_id | 8 | 0xC8 |
|   section_syntax_Indicator | 1 | '1' |
|   private_Indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for (i=0;i<num_channels_in_section;i++){ | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i<N; i++){ | | |
|       descriptor() | | |
|     } | | |
|   } | | '111111' |
|   reserved | 6 | uimsbf |
|   additional_description_length | 10 | |
|   for (j=0; j<N; j++){ | | |
|     additional_description() | | |
|   } | | rpchof |
|   CRC_32 | 32 | |
| } | | |

EV Descriptor

| Syntax | No.of bits | Format |
|---|---|---|
| extended_view_descriptor(){ | | |
|   descriptor_tag | 8 | 0xTBD |
|   descriptor_length | 8 | uimsbf |
|   reserved | 3 | '111' |
|   PCR_PID | 13 | uimsbf |
|   reserved | 5 | '11111' |
|   number_of_extended_views | 10 | uimsbf |
|   one_dimension_camera_setting_flag | 1 | bslbf |
|   for (i=0;i<number_of_extended_views;i++){ | | |
|     stream_type | 8 | uimsbf |
|     reserved | 3 | '111' |
|     elementary_PID | 13 | uimsbf |
|     left_right_pos | 2 | uimsbf |
|     if (number_of_extended_views>1&&left_right_pos !=0){ | | |
|       view_position_hor | 6 | uimsbf |
|     } | | |
|     else{ | | |
|       reserved | 6 | '111111' |
|     } | | |
|     if (one_dimension_camera_setting_flag=0){ | | |
|       up_down_pos | 2 | uimsbf |
|       if (number_of_extended_views>1&&up_down_pos !=0){ | | |
|         view_position_ver | 6 | uimsbf |
|       } | | |
|       else{ | | |
|         reserved | 6 | '111111' |
|       } | | |
|     } | | |
|     else | | |
|       reserved | 8 | '11111111' |
|     } | | |
|   } | | |
| } | | |

Fig. 6

| Syntax | No. of bits | Format |
|---|---|---|
| extended_view_descriptor ( ) { | | |
|     descriptor_tag | 8 | 0xTBD |
|     descriptor_length | 8 | uimsbf |
|     reserved | 3 | '111' |
|     PCR_PID | 13 | uimsbf |
|     reserved | 5 | '11111' |
|     number_of_views | 10 | uimsbf |
|     one_dimension_camera_setting_flag | 1 | bslbf |
|     for (i=0; i<number_of_views; i++) { | | |
|         stream_type | 8 | uimsbf |
|         reserved | 3 | '111' |
|         elementary_PID | 13 | uimsbf |
|         left_right_pos | 2 | uimsbf |
|         view_position_hor * | 6 | uimsbf |
|         if (one_dimension_camera_setting_flag == 0) { | | |
|             up_down_pos | 2 | uimsbf |
|             view_position_ver ** | 6 | uimsbf |
|         } | | |
|         else { | | |
|             reserved | 8 | '11111111' |
|         } | | |
|     } | | |
| } | | |

Fig. 7

| Syntax | No. of bits | Format |
|---|---|---|
| component_list_descriptor ( ) { | | |
|     descriptor_tag | 8 | 0xBB |
|     descriptor_length | 8 | uimsbf |
|     alternate | 1 | bslbf |
|     component_count | 7 | uimsbf |
|     for (i=0; i < component_count; i++) { | | |
|         stream_type | 8 | uimsbf |
|         format_identifier | 32 | uimsbf |
|         length_of_details | 8 | uimsbf |
|         stream_info_details ( ) { | | |
|             reserved | 3 | uimsbf |
|             elementary_PID | 13 | uimsbf |
|             left_right_pos | 2 | bslbf |
|             up_down_pos | 2 | uimsbf |
|             view_position_hor | 6 | uimsbf |
|             view_position_ver | 6 | uimsbf |
|         } | | |
|     } | | |
| } | | |

Fig. 8

| Syntax | No. of bits | Format |
|---|---|---|
| extended_view_descriptor () { | | |
|     descriptor_tag | 8 | 0xTBD |
|     descriptor_length | 8 | uimsbf |
|     reserved | 3 | '111' |
|     PCR_PID | 13 | uimsbf |
|     reserved | 5 | '11111' |
|     number_of_extended_views | 10 | uimsbf |
|     one_dimension_camera_setting_flag | 1 | bslbf |
|     for (i=0; i<number_of_extended_views; i++) { | | |
|         stream_type | 8 | uimsbf |
|         reserved | 3 | '111' |
|         elementary_PID | 13 | uimsbf |
|         left_right_pos | 2 | uimsbf |
|         view_position_hor | 6 | uimsbf |
|         if (one_dimension_camera_setting_flag == 0) { | | |
|             up_down_pos | 2 | uimsbf |
|             view_position_ver | 6 | uimsbf |
|         } | | |
|         else { | | |
|             reserved | 8 | '11111111' |
|         } | | |
|     } | | |
| } | | |

FIG. 9

| Syntax | No.of Bits | Format |
|---|---|---|
| event_information_table_section(){ | | |
|   table_id | 8 | 0xCB |
|   section_syntax_Indicator | 1 | '1' |
|   private_Indicator | 1 | '1' |
|   reserved | 2 | '11' |
|   section_length | 12 | uimsbf |
|   source_id | 16 | uimsbf |
|   reserved | 2 | '11' |
|   version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   num_events_in_section | 8 | uimsbf |
|   for (j=0;j<num_events_in_section;j++){ | | |
|     reserved | 2 | '11' |
|     event_id | 14 | uimsbf |
|     start_time | 32 | uimsbf |
|     reserved | 2 | '11' |
|     ETM_location | 2 | uimsbf |
|     length_in_seconds | 20 | uimsbf |
|     title_length | 8 | uimsbf |
|     title_text() | var | |
|     reserved | 4 | '1111' |
|     descriptors_length | 12 | |
|     for (i=0;i<N;i++){ | | |
|       descriptor() | | |
|     } | | |
|   } | | |
|   CRC_32 | 32 | rpchof |
| } | | |

EV Descriptor

| Syntax | No.of bits | Format |
|---|---|---|
| extended_view_descriptor(){ | | |
|   descriptor_tag | 8 | 0xTBD |
|   descriptor_length | 8 | uimsbf |
|   reserved | 3 | '111' |
|   PCR_PID | 13 | uimsbf |
|   reserved | 5 | '11111' |
|   number_of_extended_views | 10 | uimsbf |
|   one_dimension_camera_setting_flag | 1 | bslbf |
|   for (i=0; i<number_of_extended_views;i++){ | | |
|     stream_type | 8 | uimsbf |
|     reserved | 3 | '111' |
|     elementary_PID | 13 | uimsbf |
|     left_right_pos | 2 | uimsbf |
|     view_position_hor | 6 | uimsbf |
|     if (one_dimension_camera_setting_flag==0){ | | |
|       up_down_pos | 2 | uimsbf |
|       view_position_ver | 6 | uimsbf |
|     } | | |
|     else{ | | |
|       reserved | 8 | '11111111' |
|     } | | |
|   } | | |
| } | | |

Fig. 10

| Syntax | No. of bits | Format |
|---|---|---|
| extended_view_descriptor () { | | |
|     descriptor_tag | 8 | uimsbf |
|     descriptor_length | 8 | uimsbf |
|     descriptor_tag_extension | 8 | uimsbf |
|     reserved | 5 | '11111' |
|     number_of_extended_views | 10 | uimsbf |
|     one_dimension_camera_setting_flag | 1 | bslbf |
|     for (i=0; i<number_of_extended_views; i++) { | | |
|         left_right_pos | 2 | uimsbf |
|         if (number_of_extended_views > 1 \|\| left_right_pos !=0 ) { | | |
|             view_position_hor | 6 | uimsbf |
|         } | | |
|         else { | | |
|             reserved | 6 | '111111' |
|         } | | |
|         if (one_dimension_camera_setting_flag == 0) { | | |
|             up_down_pos | 2 | uimsbf |
|             if (number_of_extended_views > 1 \|\| up_down_pos!=0) { | | |
|                 view_position_ver | 6 | uimsbf |
|             } | | |
|             else { | | |
|                 reserved | 6 | '111111' |
|             } | | |
|         } | | |
|         else | | |
|             reserved | 8 | '11111111' |
|     } | | |
| } | | |

FIG. 11

| Syntax | No. of bits | identifier |
|---|---|---|
| service_description_section(){ | | |
|   table_id | 8 | uimsbf |
|   section_syntax_Indicator | 1 | bslbf |
|   reserved_future_use | 1 | bslbf |
|   reserved | 2 | bslbf |
|   section_length | 12 | uimsbf |
|   transport_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   original_network_id | 16 | uimsbf |
|   reserved_future_use | 8 | bslbf |
|   for (i=0; i<N;i++){ | | |
|     service_id | 16 | uimsbf |
|     reserved_future_use | 6 | bslbf |
|     EIT_schedule_flag | 1 | bslbf |
|     EIT_present_following_flag | 1 | bslbf |
|     running_status | 3 | uimsbf |
|     free_CA_mode | 1 | bslbf |
|     descriptors_loop_length | 12 | uimsbf |
|     for (j=0; j<N; j++){ | | |
|       descriptor() | | |
|     } | | |
|   } | | |
|   CRC_32 | 32 | rpchof |
| } | | |

EV Descriptor

| Syntax | No. of bits | Format |
|---|---|---|
| extended_view_descriptor(){ | | |
|   descriptor_tag | 8 | uimsbf |
|   descriptor_length | 8 | uimsbf |
|   descriptor_tag_extension | 8 | uimsbf |
|   reserved | 5 | '11111' |
|   number_of_extended_views | 10 | uimsbf |
|   one_dimension_camera_setting_flag | 1 | bslbf |
|   for (i=0; i<number_of_extended_views;i++){ | | |
|     left_right_pos | 2 | uimsbf |
|     if (number_of_extended_views>1 left_right_pos !=0){ | | |
|       view_position_hor | 6 | uimsbf |
|     } | | |
|     else{ | | |
|       reserved | 6 | '111111' |
|     } | | |
|     if (one_dimension_camera_setting_flag==0){ | | |
|       up_down_pos | 2 | uimsbf |
|       if (number_of_extended_views>1 up_down_pos !=0){ | | |
|         view_position_ver | 6 | uimsbf |
|       } | | |
|       else{ | | |
|         reserved | 6 | '111111' |
|       } | | |
|     } | | |
|     else | | |
|       reserved | 8 | '11111111' |
|   } | | |
| } | | |

FIG. 12

| Syntax | No. of bits | mnemonic |
|---|---|---|
| TS_program_map_section(){ | | |
|   table_id | 8 | uimsbf |
|   section_syntax_Indicator | 1 | bslbf |
|   '0' | 1 | bslbf |
|   reserved | 2 | bslbf |
|   section_length | 12 | uimsbf |
|   program_number | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for (i=0; i<N;i++){ | | |
|     descriptor() | | |
|   } | | |
|   for (i=0;i<N1;i++){ | | |
|     stream_type | 8 | uimsbf |
|     reserved | 3 | bslbf |
|     elementary_PID | 13 | uimsbf |
|     reserved | 4 | bslbf |
|     ES_infor_length | 12 | uimsbf |
|     for (i=0;i<N2;i++){ | | |
|       descriptor() | | |
|     } | | |
|   } | | |
|   CRC_32 | 32 | rpchof |
| } | | |

0x1B for AVC/H.264 video
0x20 for MVC extension video extended_view_descriptor1

| Syntax | No. of bits | Format |
|---|---|---|
| extended_view_descriptor1(){ | | |
|   descriptor_tag | 8 | 0xTBD |
|   descriptor_length | 8 | uimsbf |
|   number_of_extended_views | 8 | uimsbf |
|   one_dimension_camera_setting_flag | 1 | bslbf |
|   reserved | 7 | '1111111' |
| } | | | extended_view_descriptor2

| Syntax | No. of bits | Format |
|---|---|---|
| extended_view_descriptor2(){ | | |
|   descriptor_tag | 8 | 0xTBD |
|   descriptor_length | 8 | uimsbf |
|   left_right_pos | 2 | bslbf |
|   if (one_dimension_camera_setting_flag==0){ | | |
|     up_down_pos | 2 | uimsbf |
|   } | | |
|   else{ | | |
|     reserved | 2 | '11' |
|   } | | |
|   if (number_of_extended_views>1){ | | |
|     view_position_hor | 6 | uimsbf |
|     if (one_dimension_camera_setting_flag==0){ | | |
|       view_position_ver | 6 | uimsbf |
|     } | | |
|     else{ | | |
|       reserved | 6 | uimsbf |
|     } | | |
|   } | | |
|   else{ | | |
|     reserved | 12 | uimsbf |
|   } | | |
| } | | |

Fig. 13

| Syntax | No. of bits | Format |
|---|---|---|
| extended_view_descriptor ( ) { | | |
|     descriptor_tag | 8 | uimsbf |
|     descriptor_length | 8 | uimsbf |
|     descriptor_tag_extension | 8 | uimsbf |
|     reserved | 5 | '11111' |
|     number_of_extended_views | 10 | uimsbf |
|     one_dimension_camera_setting_flag | 1 | bslbf |
|     for (i=0; i<number_of_extended_views; i++) { | | |
|         left_right_pos | 2 | uimsbf |
|         if (number_of_extended_views > 1 || left_right_pos !=0 ) { | | |
|             view_position_hor | 6 | uimsbf |
|         } | | |
|         else { | | |
|             reserved | 6 | '111111' |
|         } | | |
|         if (one_dimension_camera_setting_flag == 0) { | | |
|             up_down_pos | 2 | uimsbf |
|             if (number_of_extended_views > 1 || up_down_pos!=0) { | | |
|                 view_position_ver | 6 | uimsbf |
|             } | | |
|             else { | | |
|                 reserved | 6 | '111111' |
|             } | | |
|         } | | |
|         else | | |
|             reserved | 8 | '11111111' |
|         component_tag | 8 | uimsbf |
|     } | | |
| } | | |

FIG. 14

| Syntax | No. of bits | identifier |
|---|---|---|
| service_description_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   transport_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   original_network_id | 16 | uimsbf |
|   reserved_future_use | 8 | bslbf |
|   for (i=0; i<N;i++){ | | |
|     service_id | 16 | uimsbf |
|     reserved_future_use | 6 | bslbf |
|     EIT_schedule_flag | 1 | bslbf |
|     EIT_present_following_flag | 1 | bslbf |
|     running_status | 3 | uimsbf |
|     free_CA_mode | 1 | bslbf |
|     descriptors_loop_length | 12 | uimsbf |
|     for (j=0;j<N;j++){ | | |
|       descriptor() | | |
|     } | | |
|   } | | |
|   CRC_32 | 32 | rpchof |
| } | | |

EV Descriptor

| Syntax | No. of bits | Format |
|---|---|---|
| extended_view_descriptor(){ | | |
|   descriptor_tag | 8 | uimsbf |
|   descriptor_length | 8 | uimsbf |
|   descriptor_tag_extension | 8 | uimsbf |
|   reserved | 5 | '11111' |
|   number_of_extended_views | 10 | uimsbf |
|   one_dimension_camera_setting_flag | 1 | bslbf |
|   for (i=0; i<number_of_extended_views;i++){ | | |
|     left_right_pos | 2 | uimsbf |
|     if (number_of_extended_views>1&&left_right_pos !=0){ | | |
|       view_position_hor | 6 | uimsbf |
|     } | | |
|     else{ | | |
|       reserved | 6 | '111111' |
|     } | | |
|     if (one_dimension_camera_setting_flag==0){ | | |
|       up_down_pos | 2 | uimsbf |
|       if (number_of_extended_views>1&&up_down_pos !=0){ | | |
|         view_position_ver | 6 | uimsbf |
|       } | | |
|       else{ | | |
|         reserved | 6 | '111111' |
|       } | | |
|     } | | |
|     else | 8 | '11111111' |
|     reserved | 8 | uimsbf |
|     component_tag | | |
|   } | | |
| } | | |

FIG. 15

| Syntax | No. of bits | Mnemonic |
|---|---|---|
| TS_program_map_section(){ | | |
|     table_id | 8 | uimsbf |
|     section_syntax_Indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0; i<N;i++){ | | |
|         descriptor() | | |
|     } | | |
|     for (i=0;i<N1;i++){ | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0;i<N2;i++){ | | |
|             descriptor() | | |
|         } | | |
|     } | | |
|     CRC_32 | 32 | rpchof |
| } | | |

0x1B for AVC/H.264 video
0x20 for SVC extension video

| Syntax | No. of bits | Format |
|---|---|---|
| stream_identifier_descriptor(){ | | |
|     descriptor_tag | 8 | uimsbf |
|     descriptor_length | 8 | uimsbf |
|     component_tag | 8 | uimsbf |
| } | | |

Fig. 16

| Syntax | No. of bits | Format |
|---|---|---|
| extended_view_descriptor () { | | |
|     descriptor_tag | 8 | uimsbf |
|     descriptor_length | 8 | uimsbf |
|     descriptor_tag_extension | 8 | uimsbf |
|     reserved | 5 | '11111' |
|     number_of_extended_views | 10 | uimsbf |
|     one_dimension_camera_setting_flag | 1 | bslbf |
|     for (i=0; i<number_of_extended_views; i++) { | | |
|         left_right_pos | 2 | uimsbf |
|         view_position_hor * | 6 | uimsbf |
|         if (one_dimension_camera_setting_flag == 0) { | | |
|             up_down_pos | 2 | uimsbf |
|             view_position_ver ** | 6 | uimsbf |
|         } | | |
|         else { | | |
|             reserved | 8 | '11111111' |
|         } | | |
|         component_tag | 8 | uimsbf |
|     } | | |
| } | | |

FIG. 17

| Syntax | No. of bits | identifier |
|---|---|---|
| event_information_table_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   service_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   transport_stream_id | 16 | uimsbf |
|   original_network_id | 16 | uimsbf |
|   segment_last_section_number | 8 | uimsbf |
|   last_table_id | 8 | uimsbf |
|   for (j=0; i<N;i++){ | | |
|     event_id | 16 | uimsbf |
|     start_time | 40 | bslbf |
|     duration | 24 | uimsbf |
|     running_status | 3 | uimsbf |
|     free_CA_mode | 1 | bslbf |
|     descriptors_loop_length | 12 | uimsbf |
|     for (i=0;i<N;i++){ | | |
|       descriptor() | | |
|     } | | |
|   } | | |
|   CRC_32 | 32 | rpchof |
| } | | |

EV Descriptor

| Syntax | No. of bits | Format |
|---|---|---|
| extended_view_descriptor(){ | | |
|   descriptor_tag | 8 | uimsbf |
|   descriptor_length | 8 | uimsbf |
|   descriptor_tag_extension | 8 | uimsbf |
|   reserved | 5 | '11111' |
|   number_of_extended_views | 10 | uimsbf |
|   one_dimension_camera_setting_flag | 1 | bslbf |
|   for (i=0; i<number_of_extended_views;i++){ | | |
|     left_right_pos | 2 | uimsbf |
|     view_position_hor | 6 | uimsbf |
|     if (one_dimension_camera_setting_flag==0){ | | |
|       up_down_pos | 2 | uimsbf |
|       view_position_ver | 6 | uimsbf |
|     } | | |
|     else{ | | |
|       reserved | 8 | '11111111' |
|     } | | |
|     component_tag | 8 | uimsbf |
|   } | | |
| } | | |

Fig. 22

| | 21:00 | 21:40 | 22:30 | 23:10 | |
|---|---|---|---|---|---|
| 9-1 KBC-1 | news | epic drama [3D] | documentary [3D] | .... | |
| 11-1 MBS-1 | news | | sports | daily soaps | .... |

DIGITAL BROADCASTING RECEPTION METHOD CAPABLE OF DISPLAYING STEREOSCOPIC IMAGE, AND DIGITAL BROADCASTING RECEPTION APPARATUS USING THE SAME

This application claims the benefit of priority of U.S. Provisional Application Nos. 61/138,939 filed on Dec. 18, 2008, 61/139,623 filed on Dec. 21, 2008 and PCT Application No. PCT/KR2009/003481 filed on Aug. 26, 2009, all of which are incorporated by reference in their entirety herein.

TECHNICAL FIELD

The present invention relates to a digital broadcast receiving method and apparatus and, more particularly, to a digital broadcast receiving method for displaying stereoscopic images and a digital broadcast receiving apparatus using the same.

BACKGROUND ART

Recently, as the interest in stereoscopic image services is growing, devices for providing stereoscopic images continue to be developed. Among the schemes for implementing such stereoscopic images is a stereoscopic scheme.

A basic principle of the stereoscopic scheme is that images arranged to be perpendicular to the left and right eyes of a person (or a user) are separately input and each image respectively input to the left and right eyes are combined in the user's brain to generate a stereoscopic image. In this case, the arrangement of the images such that they are perpendicular means that the respective images do not interfere with each other.

Methods for preventing interference include a polarization scheme, a time-sequential scheme, and a spectral scheme.

First, the polarization scheme is to separate respective images by using a polarization filter. Namely, the polarization filter perpendicular to an image for the left eye and an image for the right eye is employed to allow different images filtered by the polarization filter to be input to the left and right visual fields. The time-division scheme is that left and right images are alternately displayed and active glasses worn by the user is synchronized with the alternately displayed images to thus separate the respective images. Namely, when the images are alternately displayed, the shutter of the synchronized active glasses opens only the visual field to which a corresponding image is to be input and blocks the other visual field to separately input the left and right images.

Meanwhile, the spectral scheme projects left and right images through a spectral filter having a spectrum band in which RGB spectrums do not overlap with each other. With respect to the thusly projected left and right images, the user wears passive glasses including a spectral filter passing through only a spectral area set for the left and right images, thus separately receiving the left and right images.

However, the related art digital broadcast is based on two-dimensional (2D) images. For example, a PSIP (Program and System Information Protocol) used in the ATSC (Advanced Television Systems Committee) type digital broadcast is targeted only for a 2D image service.

Thus, in order to provide a stereoscopic image in the digital broadcast, a signal for a stereoscopic image in a PSIP used in the existing ATSC type digital broadcast or in SI (Service Information) used in a DVB (Digital Video Broadcasting) type digital broadcast must be checked and processed.

Also, in order to effectively process such stereoscopic image signals in the digital broadcast, a digital broadcast receiving apparatus is required to be configured to be able to receive and process stereoscopic image signals.

DISCLOSURE OF THE INVENTION

Therefore, an object of the present invention is to provide a digital broadcast receiving method capable of checking and processing signals for stereoscopic images to display the stereoscopic images.

Another object of the present invention is to provide a digital broadcast receiving apparatus capable of checking and processing signals for stereoscopic images to display the stereoscopic images.

To achieve these and other advantages and in accordance with the purpose of the present invention, as embodied and broadly described herein, there is provided a digital broadcast receiving apparatus for displaying a stereoscopic image, including: a demultiplexing unit configured to demultiplex a received digital broadcast signal; a PSIP or PSI/SI processor configured to extract extension view video information from the demultiplexed digital broadcast signal; a decoder configured to decode an extension view video stream and a base view video stream from the demultiplexed digital broadcast signal; and an output formatting unit configured to format the extension view video stream and the base view video stream based on the extension view video information.

The extension view video information may include at least any one of a relative position relationship between a camera which has generated the extension view video stream and a camera which has generated the base view video stream, the number of the extension view video streams, and information regarding an arrangement structure of the cameras. The relative position relationship may include at least any one of the direction in which the camera, which has generated the extension view video stream, is positioned and the degree of separation in the direction based on the camera which has generated the base view video stream.

To achieve these and other advantages and in accordance with the purpose of the present invention, as embodied and broadly described herein, there is provided a method for receiving and processing a digital broadcast signal to display a stereoscopic image, including: a first step of receiving a digital broadcast signal and demultiplexing the received digital broadcast signal; a second step of extracting extension view video information from the demultiplexed digital broadcast signal; and a third step of decoding an extension view video stream and a base view video stream from the demultiplexed digital broadcast signal, formatting the extension view video stream and the base view video stream based on the extension view video information, and displaying the formatted streams.

In the method and apparatus for receiving a digital broadcast according to exemplary embodiments of the present invention, information regarding a stereoscopic image can be provided in various manners in the digital broadcast, and since a signal for a stereoscopic image in a digital broadcast can be checked and processed, a stereoscopic image can be displayed.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1(a) is a view for explaining a frame sequential scheme among screen transmission methods for forming a stereoscopic image;

FIG. 1(b) is a view for explaining a side-by-side scheme among the screen transmission methods for forming a stereoscopic image;

FIG. 1(c) is a view for explaining a top-down scheme among the screen transmission methods for forming a stereoscopic image;

FIG. 1(d) is a view for explaining a checker board scheme among the screen transmission methods for forming a stereoscopic image;

FIG. 2 is a view showing an example of constituting an extended view video descriptor (referred to as an 'EV descriptor, hereinafter) when information regarding an extended view video stream (referred to as an 'EVV stream', hereinafter) is provided through a TVCT (Terrestrial Virtual Channel Table) of a PSIP (Program and System Information Protocol) used in an ATSC (Advanced Television Systems Committee) type digital broadcast according to an exemplary embodiment of the present invention;

FIG. 3 is a view illustrating an example of constituting a TVCT in FIG. 2;

FIG. 6 is a view showing an example of configuring an EV descriptor by including information regarding a base view video stream according to an exemplary embodiment of the present invention;

FIG. 7 is a view showing an example of configuring a component list descriptor when information regarding the EVV stream is provided through the component list descriptor in the place of the EV descriptor according to an exemplary embodiment of the present invention;

FIG. 8 is a view showing an example of configuring an EV descriptor when information regarding the EVV stream is provided through an EIT (Event Information Table) of a PSIP (Program and System Information Protocol) used in an ATSC type digital broadcast according to an exemplary embodiment of the present invention;

FIG. 9 is a view showing an example of configuring the EIT in FIG. 8;

FIG. 10 is a view showing an example of configuring the EV descriptor when the information regarding the EVV stream is provided through an SDT (Service Description Table) of SI (Service Information) used in a DVB (Digital Video Broadcasting) type digital broadcast according to an exemplary embodiment of the present invention;

FIG. 11 is a view showing an example of configuring the SDT in FIG. 10;

FIG. 12 is a view showing an example of configuring a PMT (Program Map Table) of PSI (Program Specific Information) in FIG. 10;

FIG. 13 is a view showing an example of configuring an EV descriptor by using a component tag when the information regarding the EVV stream is provided through the SDT of the SI used in the DVB (Digital Video Broadcasting) type digital broadcast according to an exemplary embodiment of the present invention;

FIG. 14 is a view showing an example of configuring the SDT in FIG. 13;

FIG. 15 is a view showing an example of configuring a PMT (Program Map Table) of PSI (Program Specific Information) in FIG. 13;

FIG. 16 is a view showing an example of configuring an EV descriptor by using a component tag when the information regarding the EVV stream is provided through the EIT of the SI used in the DVB (Digital Video Broadcasting) type digital broadcast according to an exemplary embodiment of the present invention;

FIG. 17 is a view showing an example of configuring the EIT in FIG. 16;

FIG. 22 is a view showing an example of configuring an EPG (Electronic Program Guide) informing about whether or not a broadcast program is broadcast three-dimensionally by using the method of FIG. 21;

MODES FOR CARRYING OUT THE PREFERRED EMBODIMENTS

Figure 4:
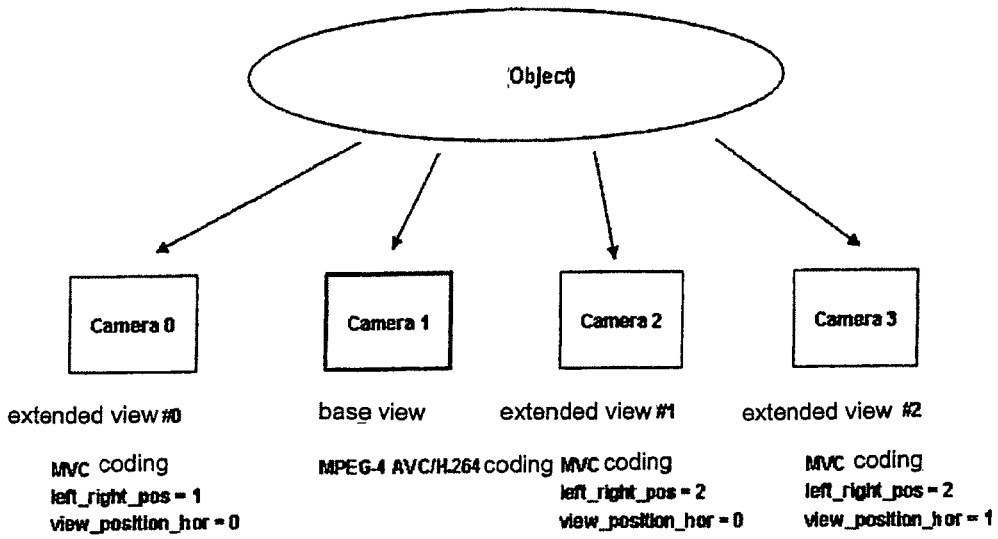
FIG. 4 is a view for explaining a method for configuring view information of a video stream when cameras are arranged one-dimensionally according to an exemplary embodiment of the present invention.

The term of 3-D or 3D is used to describe a visual expression or display technique for reproducing a 3D video having an illusion effect of depth. As for a left eye image and a right eye image, the visual cortex of an observer (or a user) interprets the two images as a single 3D image.

A 3D display technique employs 3D image processing and expressing techniques with respect to a device available for displaying 3D images. Optionally, the device available for displaying 3D images may use a special observation device in order to effectively provide 3D images to the observer.

The 3D image processing and expression techniques may include, for example, stereoscopic image/video capturing, multi-view/video capture capturing using a plurality of cameras, processing of a 2D image and depth information, and the like. Display devices for displaying a 3D image may include, for example, an LED (Liquid Crystal Display), a digital TV screen, a computer monitor, or the like, including appropriate hardware and/or software supporting 3D display techniques. Special observation devices may include, for example, specialized glasses, goggles, head gear, eyewear, and the like.

In detail, the 3D image display techniques may include an anaglyph stereoscopic image (which is generally used together with passive polarized glasses), alternate-frames sequencing (which is generally used together with active shutter glasses/head gear), an autostereoscopic display using a lenticular or barrier screen, and the like. Various concepts and features described hereinafter can be applicable to such stereoscopic image display techniques.

A 3D image display technique may use an optical device, which rotates or alternately operates, e.g., a segmented polarizer attached to a color filter wheel, and in this case, synchronization therebetween is required. Another 3D image display technique may use a digital light processor (DLP) based on a digital micromirror device (DMD) using a rotatable microscopic mirror disposed in a quadrangular arrangement corresponding to pixels of an image to be displayed.

Meanwhile, new standards related to a stereoscopic image rendering and display techniques (in particular 3D TV) are currently being developed by various enterprises, consortiums, and organizations. For example, the new standards may include SMPTE (the Society of Motion Picture and Television Engineers), CEA (Consumer Electronics Association), 3d@Home consortium, ITU (International Telecommunication Union), and the like. Besides, other standardization groups such as DVB, BDA, ARIB, ATSC, DVD forum, IEC, etc. are participating. MPEG (Moving Picture Experts Group) is participating 3D image coding of a multiview image, a stereoscopic image, and a 2D image having depth information, and currently, a multiview video codec extension with respect to MPEG-4 AVC (advanced video coding) is under standardization. Stereoscopic image coding and stereoscopic distribution formatting are related with color shifting (anaglyph), pixel sub-sampling (side-by-side, checkerboard, quincunx, etc.), and enhanced video coding (2D+Delta, 2D+Metadata, 2D having depth information). Concepts and features described herein can be applicable to such standards.

In addition, at least a portion of the concepts and features of the invention described herein are related with a 3D image display technique explained in the aspect of image reproducing and display environment with respect to a digital image or a 3D TV. However, details thereof do not limit various features described herein and can be applicable to various other types of display techniques and devices. For example, 3D TV techniques can be applicable to Blu-ray™ technology, console games, cable, IPTV transmissions, mobile phone contents delivery, and the like, as well as to TV broadcasts, and in this case, the 3D TV technique is required to be compatible with different types of TVs, a set-top box (STB), a Blu-ray™ device (e.g., a Blu-ray™ disk (BD) player), a DVD player, and a TV contents distributor.

Exemplary embodiments of the present invention will now be described in detail with reference to the accompanying drawings. The same reference numerals denote the same elements throughout the drawings.

When left and right images are transmitted to form a stereoscopic image, frames of 60 times or more per second are transmitted for the respective images. Namely, when the images are displayed on a screen at a rate of a total of 120 Hz or higher, a stereoscopic image without flickering can be implemented.

In this case, schemes for transmitting the left and right images include a frame sequential scheme, a side-by-side scheme, a top-down scheme, a checker board scheme, and the like.

As shown in FIG. 1(*a*), the frame sequential scheme is a method of sequentially alternately positioning left and right images each as one frame.

As shown in FIG. 1(*b*), the side-by-side scheme employs half sub-sampling of the left and right images, respectively, in a horizontal direction and positioning the sampled left and right images at left and right portions, respectively.

As shown in FIG. 1(*c*), the top-down scheme employs half sub-sampling of the left and right images in a vertical direction and positioning the left and right images at upper and lower portions.

As shown in FIG. 1(*d*), the checker board scheme employs half sub-sampling of the left and right images in vertical and horizontal directions and alternately positioning the pixels of the sampled left image and those of the sampled right image by one pixel each time.

The present invention proposes a stereoscopic image service descriptor providing information regarding respective images used for forming a stereoscopic image to support a stereoscopic image display in a digital broadcast, and also proposes the configuration of the syntaxes and fields of the stereoscopic image service descriptors.

In addition, the present invention proposes a digital broadcast receiving method and apparatus capable of effectively processing such a stereoscopic image service descriptor.

A video stream transmitted to implement such a stereoscopic image includes data obtained by coding left and right view image sequences.

In this case, one of the two images is used as a base view video, and the process of obtaining and decoding signaling information regarding the base view video may be the same as that of the existing method.

Namely, a PAT (Program Association Table) or a PMT (Program Map Table) of PSI (Program Specific Information) used in the existing digital broadcast standard may be used, or a TVCT (Terrestrial Virtual Channel Table), or the like, used in an ATSC (Advanced Television Systems Committee) scheme may be used to obtain and decode information regarding a base view video stream according to an exemplary embodiment of the present invention.

Meanwhile, in an exemplary embodiment, an extended view refers to a view other than the foregoing base view. In an exemplary embodiment of the present invention, the extended view refers to a video stream of a view other than the base view among video streams of two views.

The present invention proposes a method and apparatus for obtaining and processing a video signal in the extended view, namely, by using signaling information regarding an extended view video stream. Also, an extended view descriptor is used as a method for providing information regarding the extended view video stream.

Hereinafter, the configuration of the EV descriptor according to an exemplary embodiment of the present invention will now be described in detail. Also, various methods for providing the EV descriptor in the respective digital broadcast schemes according to an exemplary embodiment of the present invention will now be described.

Currently, digital broadcast schemes may be divided into an ATSC (Advanced Television Systems Committee) scheme and a DVB (Digital Video Broadcasting) scheme. The ATSC scheme is largely used for digital broadcasts in North America and the DVB scheme is largely used in Europe.

FIGS. 2 and 3 are views illustrating a case of providing information regarding an EVV stream through a TVCT (Terrestrial Virtual Channel Table) of a PSIP (Program and System Information Protocol) used in the ATSC type digital broadcast.

FIG. 2 shows an example of configuring an EV descriptor and FIG. 3 shows an example of configuring a TVCT.

Every image is captured by cameras, so video streams captured by the respective cameras have the same field value setting the position relationship of corresponding cameras.

In an exemplary embodiment of the present invention, five fields of "one_dimension_camera_setting_flag", "left_right_pos", "up_down_pos", "view_position_hor", and "view_position_ver" are used to set the position relationship of the cameras.

Each field constituting the EV descriptor illustrated in FIG. 2 according to an exemplary embodiment of the present invention will now be described. For a simple and clear description of the present invention, English expressions of the fields constituting a syntax will be used as it is and discriminated by using double quotation marks.

"descriptor_tag" is a field for discriminating the descriptor, and has a value of 8 bits.

"descriptor_length" indicates the overall length of a following field by the number of bits, and has a value of 8 bits.

"reserved" is a field which is not currently used in a system but is likely to be used in the future. It is filled with 0 according to the number of bits thereof until such is newly defined.

"PCR_PID" indicates a PID (Packet Identifier) including timing information of a program, and has a value of 13 bits.

"number_of_extended_views" indicates the number of EVV streams, and has a value of 10 bits. In case of a stereoscopic video, this field has at least one or more values. Namely, in case of the stereoscopic video, one EVV stream is used besides the base view video stream, so the number of EVV streams is at least one or more.

"one_dimension_camera_setting_flag" indicates the type of camera arrangement, and has a value of 1 bit. When the value of this field is '1', it means that a camera arrangement is a one-dimensional horizontal arrangement, and when the value of this field is '0', it means that a camera arrangement is 2-dimensional vertical/horizontal arrangement.

"stream_type" indicates the type of an elementary stream, and has a value of 8 bits. For example, when the value of "stream_type" is 0x20, it can be known that a corresponding elementary stream has been coded by MVC (Multiview Video Codec).

"elementary_PID" includes PID (Packet Identifier) of an elementary stream, and has a value of 13.

"left_right_pos" indicates whether the position of the EVV stream is the right or the left based on a camera of the base view, and has a value of 2 bits. This field indicates whether a corresponding camera is positioned in a leftward direction or rightward direction based on the camera of the base view.

When the position of the corresponding camera is the same as the camera of the base view in a horizontal axis direction, the value of this field is '0'. When the camera is positioned in the leftward direction based on the camera of the base view, the value of this field is '1', and when the camera is positioned in the rightward direction based on the camera of the base view, the value of this field is '2'. In an exemplary embodiment of the present invention, when the value of "left_right_pos" is '2', a corresponding extended view video stream is output to a right video plane and a base view video stream is output to a left video plane.

"view_position_hor" indicates which of the left cameras or right cameras in a horizontal direction based on the base view the EVV stream has been captured, or to which of multi-view planes the EVV stream is to be output. This field has a value of 6 bits.

In case of the stereoscopic image, only two of the left and right video streams are used, so this field is not required to be used. Also, when the field value of the foregoing "left_right_pos" is '0', since the corresponding camera is at the same position on a horizontal axis as that of the base view, the value of this field is meaningless.

"up_down_pos" indicates whether the EV is positioned in an upward direction or downward direction based on the camera of the base view, and has a value of 2 bits. In this case, when the corresponding camera is at the same position as the camera of the base view in a vertical axis direction, the value of this field is '0'. Also, when the EVV stream is at an upward view, the value of "up_down_pos" is '1', and when the EVV stream is at a downward view, the value of "up_down_pos" is '2'.

"view_position_ver" indicates by which of upper cameras or lower cameras in a vertical direction based on the base view the EVV stream has been captured, or to which of multi-view planes the EVV stream is to be output. This field has a value of 6 bits. Thus, in case of the stereoscopic image using only two of the left and right video streams, this field is not required to be used.

Also, when the field value of the foregoing "up_down_pos" is '0', since it means that the corresponding camera is at the same position on a vertical axis as that of the base view, the value of this field is meaningless.

As described above, the EV descriptor according to an exemplary embodiment of the present invention can accurately designate the position of the camera which has captured the corresponding EVV stream or a video plane to which the EVV stream is to be output by using the fields of "left_right_pos"와 "up_down_pos", and "view_position_hor".

Hereinafter, a method of setting major field values of the EV descriptor according to an exemplary embodiment of the present invention will now be described in detail with reference to FIGS. 4 and 5.

FIG. 4 shows the values of respective fields set according to an exemplary embodiment of the present invention when cameras are arranged one-dimensionally. FIG. 5 shows the values of the respective fields set according to an exemplary embodiment of the present invention when cameras are arranged two-dimensionally.

In FIG. 4, camera 1 is a camera of a base view, and in this case, a video stream from the camera of the base view is coded by a codec of MPEG-4 AVC/H.264. The values of the respective fields with respect to the video stream captured by the camera of the base view are all '0'.

Meanwhile, video streams captured by camera 0, camera 2, and camera 3 (excluding camera 1 of the base view) constitute an EVV stream and are all coded by an MVC (Multiview Video Codec). In this case, field values set for the camera 0 at a first position in the leftward direction of the camera 1 of the base view are "left_right_pos"=1 (leftward direction) and "view_position_hor"=0 (first position).

Meanwhile, field values set for the camera 2 at a first position in the rightward direction of the camera 1 of the base view are "left_right_pos"=2 (rightward direction) and "view_position_hor"=0 (first position). Field values set for the camera 3 at a second position in the rightward direction of the camera 1 of the base view are "left_right_pos"=2 (rightward direction) and "view_position_hor"=1 (second position).

In this manner, in the present exemplary embodiment, the position information is set for each of the cameras having the one-dimensional arrangement to thereby set appropriate position relationship information regarding the EVV streams generated by the respective cameras.

Next, a method for setting major field values according to an exemplary embodiment of the present invention when the cameras are arranged two-dimensionally will now be described. In FIG. 5, it is noted that the cameras 3 to camera 5 are positioned in a downward direction of the camera 0 to camera 2, rather than being positioned in a backward direction of the camera 0 to camera 2.

Figure 5:
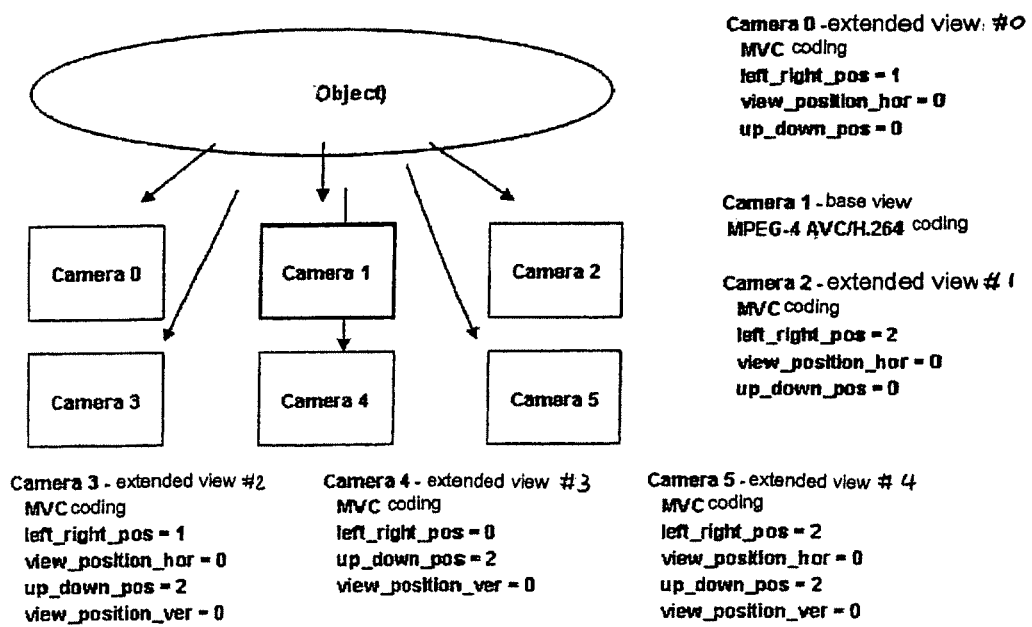
FIG. 5 is a view for explaining a method for configuring view information of a video stream when cameras are arranged two-dimensionally according to an exemplary embodiment of the present invention.

In FIG. 5, camera 1 is a camera of the base view, and a video stream generated from such camera of the base view is coded according to MPEG-4 AVC/H.264. The respective field values with respect to the video stream captured by the camera of the base view are all '0'.

Meanwhile, video streams captured by the camera 0 and camera 2 to camera 5 (excluding camera 1 of the base view) constitute EVV streams and are all coded by MVC.

Field values set for camera 3 positioned at a lower end of the left side of camera 1 of the base view are "left_right_pos"=1 (leftward direction), "view_position_hor"=0 (first position), "up_down_pos"=2 (downward direction), and "view_position_ver"=0 (first position).

Also, field values set for the camera 4 positioned immediately under the camera 1 of the base view are "left_right_pos"=0 (base view), "up_down_pos"=2 (downward direction), and "view_position_ver"=0 (first position).

Field values set for the camera 5 positioned at a lower end of the right side of the camera 1 of the base view are "left_right_pos"=2 (rightward direction), "view_position_hor"=0 (first position), "up_down_pos"=2 (downward direction), and "view_position_ver"=0 (first position).

In this manner, position information regarding the respective cameras having the two-dimensional arrangement are set to thus set appropriate position relationship information regarding the EVV streams generated by the respective cameras.

Meanwhile, in the present exemplary embodiment, it is described that only the information regarding the extended view video stream is included in the EV descriptor, but information regarding the base view video stream may be also included together in the EV descriptor according to the present exemplary embodiment.

Namely, instead of processing the base view video stream captured by the camera of the base view according to the existing scheme, the information regarding the base view video stream may be included along with the information regarding the EVV stream in the EV descriptor and processed.

In this case, the configuration of the EV descriptor is almost the same as the EV descriptor of FIG. 2, and in this case, the base view video stream is incorporated with the EVV stream by changing the "number_of_extended_views" field of FIG. 2 to "number_of_views". Also, when a variable i=0, it may be set to indicate information regarding the base view video stream. FIG. 6 shows a configuration formed by including the information regarding the base view video stream together in the EV descriptor of the present exemplary embodiment.

In this case, all the field values for setting the position relationship with respect to the base view video stream are '0'. In other words, the fields are set such that "left_right_pos"=0, "view_position_hor"=0, "up_down_pos"=0, and "view_position_ver"=0.

FIG. 3 shows an example of configuring a TVCT including the EV descriptor of FIG. 2 according to an exemplary embodiment of the present invention. The respective fields of the TVCT illustrated in FIG. 3 will now be described.

"table_id" indicates a table to which a corresponding section belongs, and has a value of 8 bits.

"section_syntax_indicator" indicates that a corresponding section is compatible with PSI (Program Specific Information) of MPEG-2 system standards, and has a value of 1 bit.

"private_indicator" indicates that a corresponding table is a private table of MPEG-2.

"reserved" is a field which is not currently used in a system but is likely to be used in the future. It is filled with 0 according to the number of bits thereof until such is newly defined.

"section_length" indicates, in units of bits/bytes, the length of the table that follows a corresponding field, and has a value of 12 bits.

"transport_stream_id" identifies a corresponding transport stream corresponding to each output when several multipliers exist in a network, and has a value of 16 bits.

"version_number" indicates the version when a corresponding table is created, and has a value of 5 bits. The version number is increased whenever content of the table is altered.

"current_next_indicator" indicates whether or not content of a corresponding table is to be currently applied or to be applied next time, and has a value of 1 bit.

"section_number" indicates the number of a corresponding section, and has a value of 8 bits.

"last_section_number" indicates "section_number" of the last section of a current table, and has a value of 8 bits.

"protocol_version" indicates the version of a protocol currently defined to be used, and has a value of 8 bits.

"num_channels_in_section" designates the number of the entire virtual channels existing in a TVCT section, and has a value of 8 bits.

"short name" is seven 16-bit character codes coded by UNICODE, and indicates the name of a virtual channel.

"major_channel_number" indicates a major channel number related to a virtual channel, which is used as a user reference number with respect to a corresponding virtual channel and has a 10-bit value.

"minor_channel_number" is used along with the "major_channel_number" so as to be used as channel numbers of two parts, and has a value of 10 bits.

"modulation_mode" indicates a modulation scheme with respect to a transmission carrier of a corresponding virtual channel, and has a value of 8 bits.

"carrier_frequency" indicates a carrier frequency related to an analog/digital transmission of a virtual channel, and has a value of 32 bits.

"channel_TSID" designates an ID value of an MPEG-2 transport stream connected to an mpeg-2 transport stream used as the reference of a virtual channel, and has a value of 16 bits.

"program_number" is used to connect a program number defined in a PAT (Program Association Table) and a PMT (Program Map Table) of the MPEG-2 system, and has a value of 16 bits.

"ETM_location" indicates the presence of an ETT (Event Text Table) in a transmitted current channel or at a different position, and has a value of 2 bits.

"access_controlled" indicates whether or not accessing an event connected to a corresponding virtual channel is limited, and has a value of 1 bit.

"hidden" indicates whether a corresponding virtual channel can be directly accessed, and has a value of 1 bit.

"service_type" discriminates whether or not the type of a service carried in a corresponding virtual channel is an analog or ATSC DTV (Digital Television)/audio/data, and has a value of 6 bits.

"source_id" indicates a programming source connected to a corresponding virtual channel, and has a value of 16 bits. Here, the source refers to a particular source such as video, text, data, or audio.

"descriptors_length" indicates the overall length of a descriptor of a corresponding virtual channel, and has a value of 10 bits.

"additional_descriptors_length" indicates the overall length of all the TVCT descriptors following a current field.

"CRC_32" indicates the value of a CRC (cyclic redundancy check) code used in the MPEG-2 system standard whose overall section is completed, and has a value of 32 bits. Whether or not a transmitted section has an error can be discovered by checking the CRC code.

In this manner, in the ATSC type digital broadcast using a fixed virtual channel, information regarding an EVV stream in each virtual channel can be provided through the TVCT (Terrestrial Virtual Channel Table) of the PSIP (Program and System Information Protocol) according to an exemplary embodiment of the present invention.

Meanwhile, in the present exemplary embodiment, the EV descriptor may be replaced by a previously defined (predefined) component list descriptor, and used.

FIG. 7 is a view showing the configuration of the component list descriptor when information regarding the EVV stream is provided through the component list descriptor in the place of the EV descriptor according to an exemplary embodiment of the present invention.

The component list descriptor is defined to improve expandability in the ATSC type digital broadcast, which is positioned at the TVCT in the PSIP.

Fields of the component list descriptor illustrated in FIG. 7 will now be described and, in this case, the description of the same fields which have been already described above will be omitted.

"alternate" indicates whether or not the component list descriptor is an alternate description of a stream related to a corresponding virtual channel, and has a value of 1 bit.

"component_count" indicates the number of components, and has a value of 7 bits. In case of several EVV streams, the number of the EVV streams can be indicated by using this field.

"stream_type" indicates the type of an elementary stream, and has a value of 8 bits. When a corresponding EVV stream is coded by MVC (Multiview Video Codec), the value of "stream_type" indicating the type of a video stream is set to be 0x20.

"format_identifier" identifies an entity providing the "stream_type" value, and has a value of 32 bits.

"length_of_details" indicates (in units of bytes) the length of a "stream_info_details" field, and has a value of 8 bits.

"elementary_PID" includes a PID (Packet Identifier) of an elementary stream, and has a value of 13 bits. This field is used to discriminate different EVV streams.

In this manner, in the present exemplary embodiment, information regarding the EVV stream can be provided by using the existing component list descriptor without using the new descriptor, i.e., the EV descriptor.

The use of the component list descriptor can easily cope with an alteration in the codec employed in the digital broadcast.

FIGS. 8 and 9 show the case of providing information regarding the EVV stream through an EIT (Event Information Table) of the PSIP (Program and System Information Protocol) used in the ATSC type digital broadcast.

Specifically, FIG. 8 shows an example of configuring an EV descriptor according to an exemplary embodiment of the present invention, and FIG. 9 shows an example of configuring an EIT including the EV descriptor of FIG. 8.

The configuration of the EV descriptor illustrated in FIG. 8 is substantially same as that of FIG. 2, so a description of the respective fields will be omitted. In FIG. 8, when "number_of_extended_views"=1 or when "left_right_pos"=0, the "view_position_hor" field may be replaced by the "reserved" field. Also, when "number_of_extended_views"=1 or when "up_down_pos"=0, the "view_position_ver" field may be replaced by the "reserved" field.

FIG. 9 shows an example of configuring the EIT including the EV descriptor of FIG. 8. The respective fields of the EIT illustrated in FIG. 9 will be described and, in this case, the description of the same fields which have been already described above will be omitted.

"source_id" indicates a programming source connected to a corresponding virtual channel, and has a value of 16 bits. Here, source refers to a particular source such as video, text, data, or audio.

"num_events_in_section" indicates the number of events existing in an EIT section, and has a value of 8 bits.

"event_id" is an identification number indicating a corresponding event, and has a value of 14 bits.

"start_time" indicates a start time of an event by the number of seconds after 12:00 a.m., Jan. 6, 1980, and has a value of 32 bits.

"length_in_seconds" indicates the length of a corresponding event by seconds, and has a value of 20 bits.

"title_length" indicates (in units of bytes) the length of "title_text( )", and has a value of 8 bits. When the value of this field is '0', it means that there is no title for a corresponding event.

"title_text( )" indicates the title of a corresponding event by a multi-character string.

In this manner, in the present exemplary embodiment, the information regarding the EVV stream can be provided through the EIT of the PSIP used in the ATSC type digital broadcast.

As described above, when the information regarding the EVV stream is provided by means of the EIT of the PSIP, it becomes possible to perform signaling in a specific manner to indicate for each event as to whether or not a 3D broadcast service is possible. Thus, a 2D broadcast program and a 3D broadcast program can be flexibly scheduled through a single virtual channel. Also, when a broadcast program guide based on the EIT is provided, information regarding whether or not a 3D broadcast is possible for each event and relevant parameters can be additionally provided, helping the user select a program.

So far, the method for providing the information regarding the EVV stream according to an exemplary embodiment of the present invention in the ATSC scheme, a digital broadcast scheme, which is largely used in North America has been described. Hereinafter, a method for providing the information regarding the EVV stream according to an exemplary embodiment of the present invention in the DVB scheme, a digital broadcast scheme, largely used in Europe will now be described.

FIG. 10 is a view showing an example of configuring the EV descriptor when the information regarding the EVV stream is provided through an SDT (Service Description Table) of SI (Service Information) used in a DVB (Digital Video Broadcasting) type digital broadcast according to an exemplary embodiment of the present invention.

FIG. 11 is a view showing an example of configuring the SDT including the EV descriptor of FIG. 10.

Respective fields constituting the EV descriptor illustrated in FIG. 10 according to an exemplary embodiment of the present invention are the same as those of FIG. 2, so the description thereof will be omitted. However, unlike the EV descriptor of FIG. 2 according to the ATSC scheme, the EV descriptor of FIG. 10 does not include "PCR_PID", "stream_type", and "elementary_PID" fields.

FIG. 11 shows an example of configuring the SDT including the EV descriptor of FIG. 10. The respective fields of the SDT illustrated in FIG. 11 will now be described.

"table_id" indicates a table to which a corresponding section belongs, and has a value of 8 bits.

"section_syntax_indicator" indicates that a corresponding section is compatible with the PSI of the MPEG-2 system standard, and has a value of 1 bit.

"reserved" is a field which is not currently used in a system but is likely to be used in the future. It is filled with 0 according to the number of bits thereof until such is newly defined.

"section_length" indicates the length of a corresponding section, and has a value of 12 bits.

"transport_stream_id" identifies a corresponding transport stream corresponding to each output when several multipliers exist in a network, and has a value of 16 bits.

"version_number" indicates content which is different from service information or program guide information which was transmitted beforehand, and has a value of 5 bits. This field is used such that the "version_number" used beforehand is increased in order.

"current_next_indicator" indicates whether or not transmitted content is to be immediately applied or to be applied next time, and has a value of 1 bit.

"section_number" indicates the number of a corresponding section, and has a value of 8 bits.

"last_section_number" indicates "section_number" of the last section of a current table, and has a value of 8 bits.

"original_network_id" indicates "network_id" of a network which starts to transmit a corresponding transport stream, and has a value of 16 bits. Here, "network_id" is a unique identification number of the network which starts to transmit the corresponding transport stream, which is used to discriminate the network from a different network.

"service_id" is a number for discriminating a corresponding service from a different service in the transport stream, and has a value of 16 bits.

"EIT_schedule_flag" indicates whether or not EIT (Event Information Table) schedule information exists in a corresponding transport stream, and has a value of 1 bit.

"EIT_present_following_flag" indicates whether or not present information and following information exist in a corresponding transport stream, and has a value of 1 bit.

"running_status" indicates a current state of a service, and has a value of 3 bits.

"free_CA_mode" indicates whether or not an elementary stream of a corresponding service has been scrambled, and has a value of 1 bit.

"descriptors_loop_length" indicates the overall length of a subsequent descriptor, and has a value of 12 bits.

"CRC_32" indicates the value of a CRC code used in the MPEG-2 system standard whose overall section is completed, and has a value of 32 bits. Whether or not a transmitted section has an error can be discovered by checking the CRC code.

In this manner, in the present exemplary embodiment, the information regarding the EVV stream through the SDT (Service Description Table) of the SI (Service Information) used in the DVB type digital broadcast can be provided.

However, even in this method, unlike the embodiments using the TVCT of the PSIP used in the ATSC scheme as illustrated in FIGS. 2 and 3, the PMT (Program Map Table) of the PSI (Program Specific Information) is required to provide the EV descriptor information in order to provide PID information of the EVV stream. FIG. 12 shows an example of the configuration of the PMT including the EV descriptor.

Specifically, FIG. 12 shows an example of configuring the PMT in FIG. 11.

In FIG. 12, information regarding the number of EVV streams and information regarding a camera arrangement are included in an "extended_view_descriptor1" descriptor, and information regarding positions of the respective cameras is included in an "extended_view_descriptor2" descriptor.

The respective fields of the PMT illustrated in FIG. 12 will now be described.

"table_id" indicates a table to which a corresponding section belongs, and has a value of 8 bits.

"section_syntax_indicator" indicates that a corresponding section is compatible with PSI (Program Specific Information) of MPEG-2 system standards, and has a value of 1 bit.

"section_length" indicates the length of a corresponding section, and has a value of 12 bits.

"program number" indicates a program for which "program_map_pid" is to be used in a transport stream, and has a value of 16 bits. For reference, the "program_map_pid" indicates a PID of a transport stream packet including a program map section which can be applicable to a program designated by the "program number".

"version_number" indicates content which is different from service information or program guide information which was transmitted beforehand, and has a value of 5 bits. This field is used such that the "version_number" used beforehand is increased in order.

"current_next_indicator" indicates whether or not transmitted content is to be immediately applied or to be applied next time, and has a value of 1 bit.

"section_number" indicates the number of a corresponding section, and has a value of 8 bits.

"last_section_number" indicates "section_number" of the last section of a current table, and has a value of 8 bits.

"PCR_PID" includes a PID of a packet including timing information of a program, and has a value of 13 bits.

"program_info_length" indicates the size of a subsequent "program_info descriptor", and has a value of 12 bits.

"stream_type" indicates the type of an elementary stream, and has a value of 8 bits.

"elementary_PID" includes PID (Packet Identifier) of an elementary stream, and has a value of 13.

"ES_info_length" indicates the size of "ES_info descriptor" that immediately follows, and has a value of 12 bits.

In the present exemplary embodiment, PID information of each stream is recognized by linking view position information (view_position) and PID information through the EV descriptor information included in the SDT (Service Description Table) of FIG. 11 and the EV2 descriptor information included in the PMT (Program Map Table) of FIG. 12 as described above. In this case, the "left_right_pos" field may be used as the view position information (view_position) in case of a stereoscopic image.

Through the method as described above, in the present exemplary embodiment, the information regarding the EVV stream of each service can be provided through the SDT (Service Description Table) of the SI (Service Information) used in the DVB type digital broadcast.

Meanwhile, in a different exemplary embodiment, when the information regarding the EVV stream is provided through the SDT of the SI, a component tag may also be used.

FIG. 13 is a view showing an example of configuring an EV descriptor by using a component tag when the information regarding the EVV stream is provided through the SDT of the SI used in the DVB (Digital Video Broadcasting) type digital broadcast according to an exemplary embodiment of the present invention.

FIG. 14 is a view showing an example of configuring the SDT including the EV descriptor of FIG. 13.

The configurations of FIGS. 13 and 14 are similar to those of FIGS. 10 and 11 and different in that the former includes a "component_tag" field. Thus, a description of the fields of FIGS. 13 and 14 will be omitted.

Here, "component_tag" field is used to identify a component, and has a value of 8 bits. This field is set to have the same value as that of the "component_tag" field of the stream_identifier_descriptor positioned at the PMT (Program Map Table) of the PSI (Program Specific Information).

Namely, in the present exemplary embodiment, the component tag is granted to the EV descriptor positioned at the SDT, and the component tag having the same value is granted through the stream identifier descriptor in the PMT and matched to link the view position information (view_position) and the PID information to recognize the PID information of each stream. In this case, for a stereoscopic image, the "left_right_pos" may be used as the view position information (view_position).

FIG. 15 shows the configuration of the PMT. As noted in FIG. 15, the overall configuration of the PMT of FIG. 15 is the same as the case of transmitting the existing digital broadcast but different in that the component tag is granted through the stream identifier descriptor. The respective fields of the PMT of FIG. 15 are the same as those in FIG. 12 as described above, so a description thereof will be omitted.

As described above, in the present exemplary embodiment, when the information regarding the EVV stream is provided through the SDT (Service Description Table) of the SI (Service Information), the information regarding the EVV stream can be provided by using the component tag.

Also, in a different exemplary embodiment, when the information regarding the EVV stream is provided through the EIT (Event Information Table) of the SI (Service Information), the component tag may also be used.

FIG. 16 is a view showing an example of configuring an EV descriptor by using a component tag when the information regarding the EVV stream is provided through the EIT of the SI used in the DVB (Digital Video Broadcasting) type digital broadcast according to an exemplary embodiment of the present invention.

FIG. 17 is a view showing an example of configuring the EIT including the EV descriptor of FIG. 16.

In this case, the "component_tag" has the same value as the "component_tag" field of the stream identifier descriptor (stream_identifier_descriptor) positioned at the PMT (Program Map Table) of the PSI (Program Specific Information).

The respective fields constituting the EV descriptor illustrated in FIG. 16 are the same as those of FIG. 10, so a description thereof will be omitted. In FIG. 16, when "number_of_extended_views"=1 or when "left_right_pos"=0, the "view_position_hor" field may be replaced by the "reserved" field. Also, when "number_of_extended_views"=1 or when "up_down_pos"=0, the "view_position_ver" may be replaced by the "reserved" field.

FIG. 17 shows an example of configuring the EIT (Event Information Table) including the EV descriptor of FIG. 16. Respective fields of the EIT illustrated in FIG. 17 will now be described.

"table_id" indicates a table to which a corresponding section belongs, and has a value of 8 bits.

"section_syntax_indicator" indicates that a corresponding section is compatible with the PSI of the MPEG-2 system standard, and has a value of 1 bit.

"reserved_future_use" and "reserved" are fields which are not currently used in a system but are likely to be used in the future. They are filled with 0 according to the number of bits thereof until such are newly defined.

"section_length" indicates the length of a corresponding section, and has a value of 12 bits.

"service_id" is a number for discriminating a corresponding service from a different service in the transport stream, and has a value of 16 bits.

"version_number" indicates content which is different from service information or program guide information which was transmitted beforehand, and has a value of 5 bits. This field is used such that the "version_number" used beforehand is increased in order.

"current_next_indicator" indicates whether or not transmitted content is to be immediately applied or to be applied next time, and has a value of 1 bit.

"section_number" indicates the number of a corresponding section, and has a value of 8 bits.

"last_section_number" indicates "section_number" of the last section of a current table, and has a value of 8 bits.

"transport_stream_id" is a unique ID number used to discriminate a certain transport stream from a different multiplexed transport stream in a transmission system, and has a value of 16 bits.

"original_network_id" indicates "network_id" of a network which starts to transmit a corresponding transport stream, and has a value of 16 bits. Here, "network_id" is a unique identification number of the network which starts to transmit the corresponding transport stream, which is used to discriminate the network from a different network.

"segment_last_section_number" indicates "section_number" of the last section of a current subtable, and has a value of 8 bits. When a subtable is not segmented, this field has the same value as that of the "last_section_number" field.

"last_table_id" indicates "table_id" to be used finally, and has a value of 8 bits.

"event_id" is the number of identifying a corresponding individual event, and has a value of 16 bits.

"start_time" indicates a start time of an event by a UTC (Universal Time Coordinated) and an MJD (Modified Julian Date), and has a value of 40 bits.

"duration" indicates a particular time (in terms of hours, minutes, and/or seconds) using a 4-bit BCD (Binary Coded Decimal), and has a value of 24 bits.

"running_status" indicates a current state of an event, and has a value of 3 bits.

"free_CA_mode" indicates whether or not an elementary stream has been scrambled, and has a value of 1 bit.

"descriptors_loop_length" indicates an overall length of a descriptor that follows, and has a value of 12 bits.

"CRC_32" indicates a value of a CRC code used in an MPEG-2 system standard whose overall section is completed, and has a value of 32 bits.

In this manner, in the present exemplary embodiment, the component tag is granted to the EV descriptor positioned at the EIT and the component tag having the same value through the stream identifier descriptor in the PMT is matched to thus recognize the PID information of each EVV stream.

The configuration of the PMT in this case is the same as that of FIG. 15, so a description thereof will be omitted.

As described above, in the present exemplary embodiment, when the information regarding the EVV stream through the (Event Information Table) of the SI (Service Information), the information regarding the EVV stream can be provided by using the component tag.

As described above, when the information regarding the EVV stream is provided by means of the EIT of the SI, it becomes possible to perform signaling in a specific manner to indicate for each event as to whether or not a 3D broadcast service is possible, so a 2D broadcast program and a 3D broadcast program can be flexibly scheduled through a single virtual channel. Also, when a broadcast program guide based on the EIT is provided, information regarding whether or not a 3D broadcast is possible for each event and relevant parameters can be additionally provided.

Figure 18:
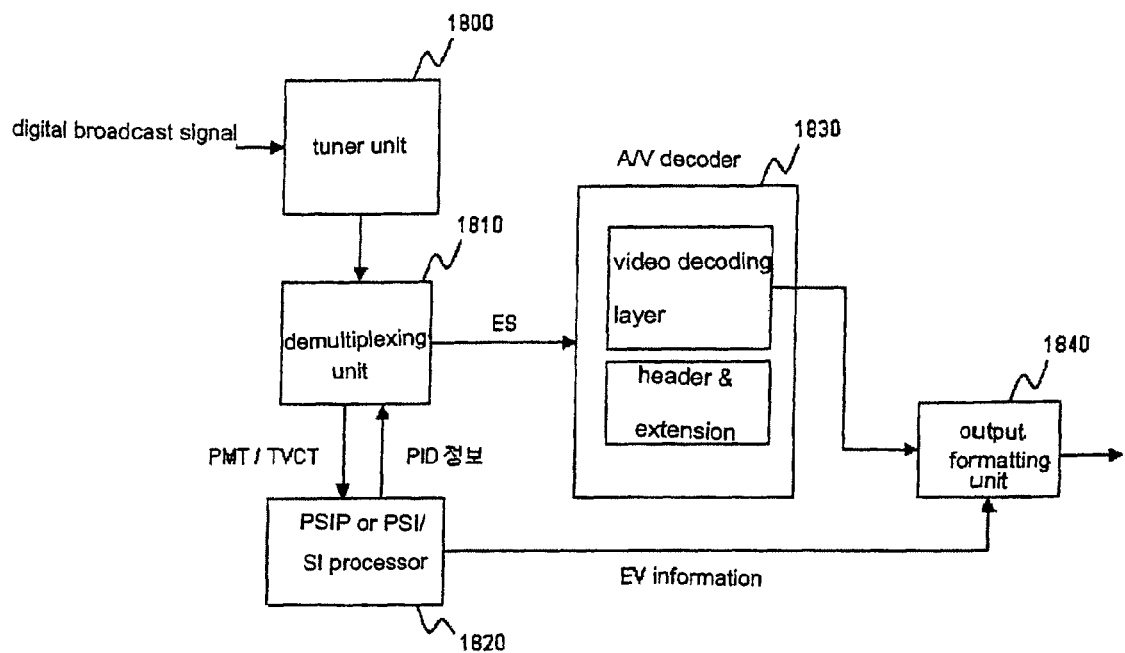
FIG. 18 is a schematic block diagram of an apparatus for receiving a digital broadcast according to an exemplary embodiment of the present invention.

The configuration and operation of a digital broadcast receiving apparatus according to an exemplary embodiment of the present invention will now be described with reference to FIG. 18. FIG. 18 is a schematic block diagram of an apparatus for receiving a digital broadcast according to an exemplary embodiment of the present invention.

As shown in FIG. 18, the digital broadcast receiving apparatus according to an exemplary embodiment of the present invention includes a tuner unit 1800 configured to receive a digital broadcast signal, detect the received signal and correct an error to generate a transport stream, a demultiplexing unit 1810 configured to filter and parse the transport stream, a PSIP or PSI/SI processor 1820 configured to extract PID (Packet Identifier) information regarding an EVV stream and extended view video information (referred to as 'EV information', hereinafter) from table information transferred from the demultiplexing unit 1810, an A/V decoder 1830 configured to perform decoding on an elementary stream, and an output formatting unit 1840 configured to format the decoded EVV stream and a base view video stream according to a stereoscopic image display output on the basis of the EV information extracted by the PSIP or PSI/SI processor 1820.

The operation of the digital broadcast receiving apparatus configured as described above will now be described in detail.

First, the tuner unit 1800 receives a digital broadcast signal, demodulates the received signal, detects the demodulated signal, and corrects an error of the signal to generate a transport stream. In general, image data transmitted by the digital broadcast signal is formatted in the form of a transport stream of an MPEG (Moving Picture Experts Group) system.

The demultiplexing unit 1810 filters and parses the transport stream to filter out a desired packet, and generates an elementary stream with respect to image information and audio information.

The PSIP or PSI/SI processor 1820 receives table information such as a PMT (Program Map Table), a TVCT (Terrestrial Virtual Channel Table), an SDT (Service Description Table), an EIT (Event Information Table), or the like, and extracts PID (Packet Identifier) and EV information regarding an EVV stream. Here, the EV information includes the number of EVV streams, a position relationship of the EVV streams with respect to a base view video stream, and the like.

The A/V decoder 1830 decodes the elementary stream to generate video streams such as the EVV stream, the base view video stream, and the like. The A/V decoder 1830 may also decode audio information but a description thereof will be omitted for the sake of brevity.

The output formatting unit 1840 formats the EVV stream and the base view video stream according to a stereoscopic display output on the basis of the EV information extracted by the PSIP or PSI/SI processor 1820, and the transmits the same.

In this case, in order to format the EVV stream and the base view video stream according to the stereoscopic display output, the output formatting unit 1840 uses view position information (view_position) of the EVV stream. In case of a stereoscopic image, the "right_left_pos" field of the EVV stream may be used as the view position information (view_position).

For example, when the "right_left_pos" field value of the EVV stream is 1, the view position of the EVV stream is positioned in a leftward direction of the base view video stream, so the output formatting unit 1840 formats the corresponding EVV stream such that it is output to a left video plane and the base view video stream such that it is output to a right video plane.

Meanwhile, when the "right_left_pos" field value of the EVV stream is 2, the view position of the EVV stream is positioned in a rightward direction of the base view video stream, so the output formatting unit 1840 formats the corresponding EVV stream such that it is output to a right video plane and the base view video stream such that it is output to a left video plane.

In this manner, since the digital broadcast receiving apparatus according to an exemplary embodiment of the present invention can check and process the signal for a stereoscopic image in the digital broadcast, it can display a stereoscopic image.

Hereinafter, a method for displaying a stereoscopic image by checking and processing information regarding an EVV stream provided in various manners by the digital broadcast receiving apparatus according to an exemplary embodiment of the present invention will now be described with reference to FIGS. 19 to 25.

Figure 19:
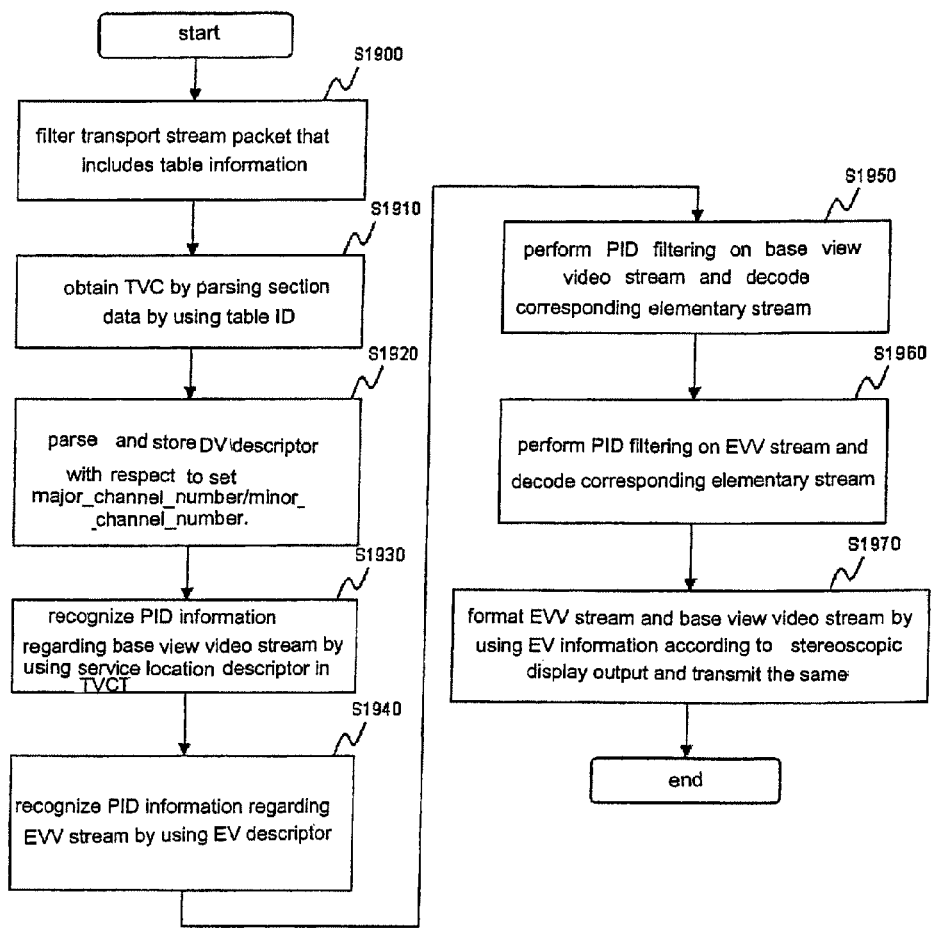
FIG. 19 is a flow chart illustrating the process of a method for checking and processing information regarding an EVV stream and outputting a stereoscopic image by a digital broadcast receiving apparatus when the information regarding the EVV is provided through the TVCT (Terrestrial Virtual Channel Table) of the PSIP (Program and System Information Protocol) used in the ATSC type digital broadcast according to an exemplary embodiment of the present invention.

FIG. 19 is a flow chart illustrating the process of a method for checking and processing information regarding an EVV stream and outputting a stereoscopic image by a digital broadcast receiving apparatus when the information regarding the EVV is provided through the TVCT (Terrestrial Virtual Channel Table) of the PSIP (Program and System Information Protocol) used in the ATSC type digital broadcast according to an exemplary embodiment of the present invention.

First, with respect to a transport stream output from the tuner unit 1800, the demultiplexing unit 1810 filters transport stream packets that include table information (step S1900). The value of a PID of the transport stream packet including a TVCT (Terrestrial Virtual Channel Table) is set to be 0x1FFB.

The demultiplexing unit 1810 obtains the TVCT by parsing section data by using table ID information (table_id) (step S1910).

The PSIP or PSI/SI processor 1820 parses an EV descriptor with respect to a virtual channel set by "major_channel_number" and "minor_channel_number" of the TVCT and stores the same (step S1920).

Also, the PSIP or PSI/SI processor 1820 obtains PID information regarding a base view video stream by using a service location descriptor in the TVCT (step S1930).

Also, the PSIP or PSI/SI processor 1820 obtains PID information and EV information by using the EV descriptor (step S1940).

And then, the demultiplexing unit 1810 performs PID filtering on the base view video stream by using the PID information of the base view video stream, and the A/V decoder 1830 decodes a corresponding elementary stream (step S1950).

Also, the demultiplexing unit 1810 performs PID filtering on the EVV stream by using the PID information regarding the EVV stream, and the A/V decoder 1830 decodes a corresponding elementary stream (step S1960).

Thereafter, the output formatting unit 1840 formats the EVV stream and the base view video stream according to a stereoscopic display output by using the EV information, and then transmits the same (step S1970).

In this manner, in the digital broadcast receiving apparatus according to an exemplary embodiment of the present invention, when the information regarding the EVV stream is provided through the TVCT of the PSIP, the information regarding the EVV stream is checked and processed to output a stereoscopic image.

Figure 20:
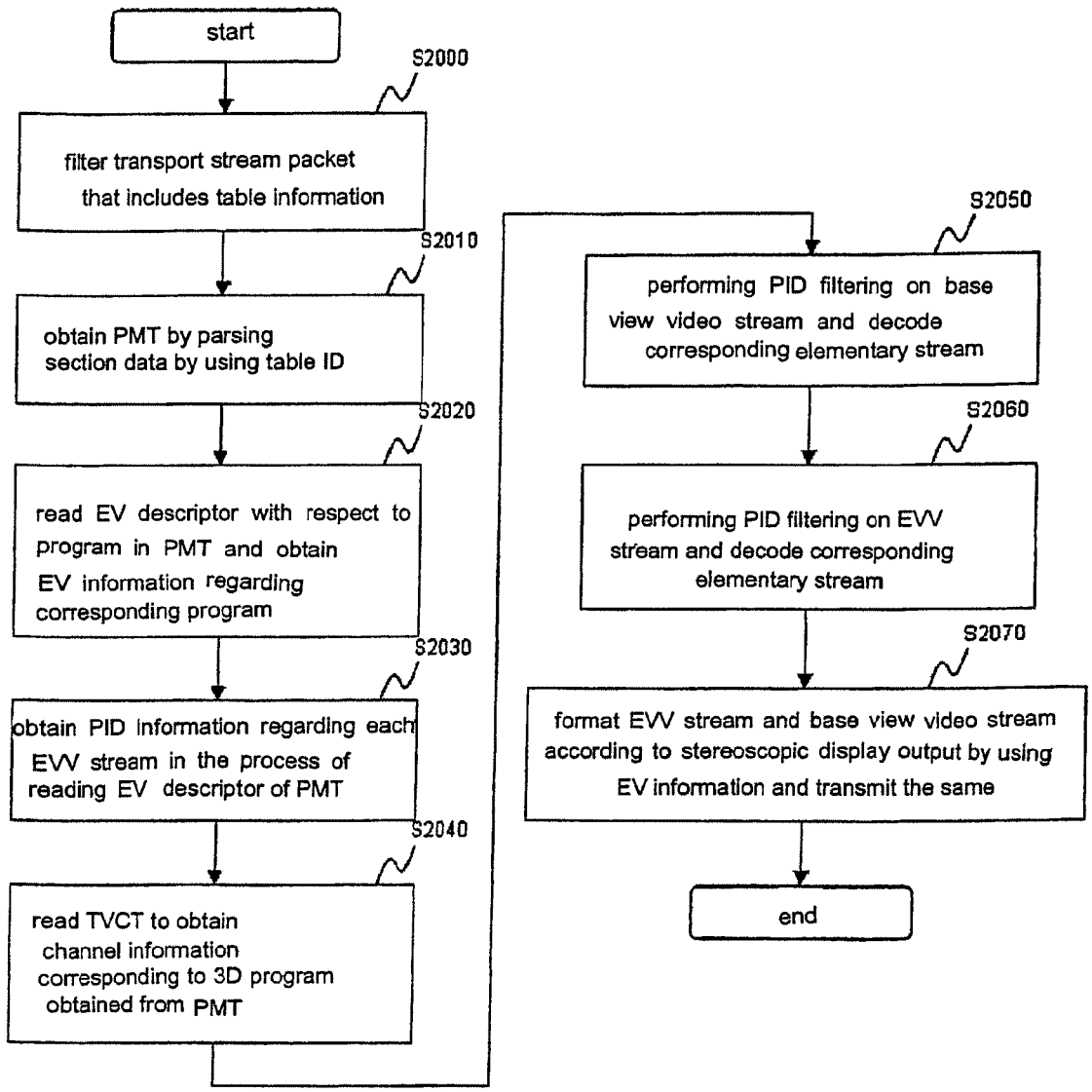
FIG. 20 is a flow chart illustrating the process of a method for checking and processing information regarding an EVV stream and outputting a stereoscopic image by a digital broadcast receiving apparatus when the information regarding the EVV is provided through the PMT (Program Map Table) of the PSIP (Program and System Information Protocol) used in the ATSC type digital broadcast according to an exemplary embodiment of the present invention.

FIG. 20 is a flow chart illustrating the process of a method for checking and processing information regarding an EVV stream and outputting a stereoscopic image by a digital broadcast receiving apparatus when the information regarding the EVV is provided through the PMT (Program Map Table) of the PSIP (Program and System Information Protocol) used in the ATSC type digital broadcast according to an exemplary embodiment of the present invention.

First, with respect to a transport stream output from the tuner unit 1800, the demultiplexing unit 1810 filters transport stream packets that include table information (step S2000). The PID of the transport stream packets that include the PMT set to have a value of 0x1 FFB.

The demultiplexing unit 1810 obtains the PMT by parsing section data by using table ID information (table_id) (step S2010).

The PSIP or PSI/SI processor 1820 reads the EV descriptor with respect to a program in the PMT and obtains EV information regarding the corresponding program (step S2020).

Also, the PSIP or PSI/SI processor 1820 obtains PID information regarding each EVV stream in the process of reading the EV descriptor of the PMT (step S2030).

And, the PSIP or PSI/SI processor 1820 reads the TVCT to obtain channel information corresponding to a 3D program obtained from the PMT by reading the TVCT (step S2040).

Thereafter, the demultiplexing unit 1810 performs PID filtering on the base view video stream by using PID information of the base view video stream, and the A/V decoder 1830 performs decoding on a corresponding elementary stream (step S2050).

Also, the demultiplexing unit 1810 performs PID filtering on the EVV stream by using the PID information regarding the EVV stream, and the A/V decoder 1830 performs decoding on the corresponding elementary stream (step S2060).

Thereafter, the output formatting unit 1840 formats the EVV stream and the base view video stream according to a stereoscopic display output by using the EV information and then transmits the same (step S2070).

In this manner, in the digital broadcast receiving apparatus according to the present exemplary embodiment, when the information regarding the EVV stream is provided through the PMT (Program Map Table) of the PSI (Program Specific Information), the information regarding the EVV stream is checked and processed to output a stereoscopic image.

Figure 21:
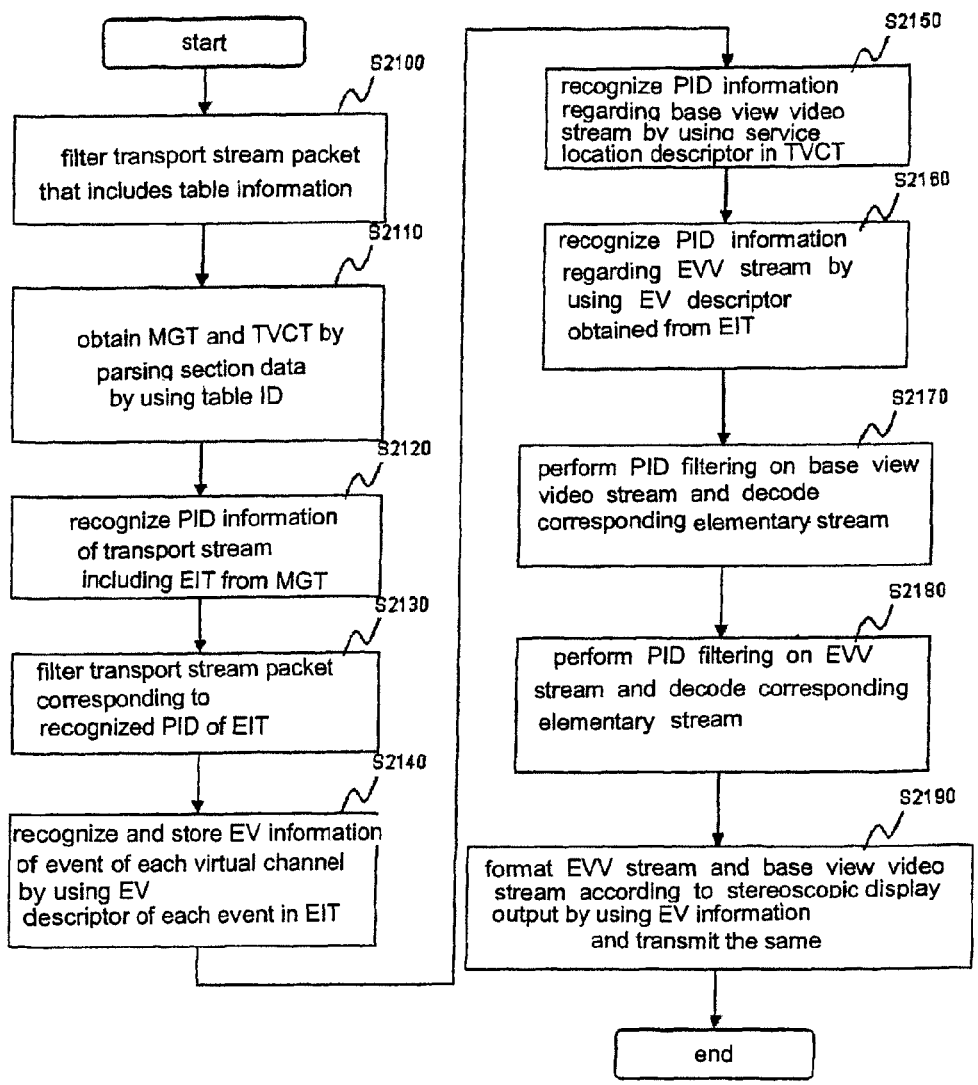
FIG. 21 is a flow chart illustrating the process of a method for checking and processing information regarding an EVV stream and outputting a stereoscopic image by a digital broadcast receiving apparatus when the information regarding the EVV is provided through the EIT (Event Information Table) of the PSIP (Program and System Information Protocol) in the ATSC type digital broadcast according to an exemplary embodiment of the present invention.

FIG. 21 is a flow chart illustrating the process of a method for checking and processing information regarding an EVV stream and outputting a stereoscopic image by a digital broadcast receiving apparatus when the information regarding the EVV is provided through the EIT (Event Information Table) of the PSIP (Program and System Information Protocol) in the ATSC type digital broadcast according to an exemplary embodiment of the present invention.

First, with respect to a transport stream output from the tuner unit 1800, the demultiplexing unit 1810 filters transport stream packets that include table information (step S2100).

The demultiplexing unit 1810 obtains an MGT (Master Guide Table) and the TVCT by parsing section data by using table ID information (table_id) (step S2110).

The PSIP or PSI/SI processor 1820 recognizes PID information of the transport stream including the EIT from the MGT (step S2120).

The demultiplexer 1810 filters a transport stream packet corresponding to the PID of the EIT recognized by the PSIP or PSI/SI processor 1820 (step S2130).

The PSIP or PSI/SI processor 1820 recognizes EV information of each event of each virtual channel by using an EV descriptor for each event in the EIT, and stores the same (step S2140).

Also, the PSIP or PSI/SI processor 1820 recognizes PID information regarding the base view video stream by using a service location descriptor in the TVCT (step S2150).

The PSIP or PSI/SI processor 1820 recognizes PID information regarding the EVV stream by using the EV descriptor obtained from the EIT (step S2160).

Thereafter, the demultiplexing unit 1810 performs PID filtering on the base view video stream by using PID information of the base view video stream, and the A/V decoder 1830 performs decoding on a corresponding elementary stream (step S2170).

Also, the demultiplexing unit 1810 performs PID filtering on the EVV stream by using the PID information regarding the EVV stream, and the A/V decoder 1830 performs decoding on the corresponding elementary stream (step S2180).

Thereafter, the output formatting unit 1840 formats the EVV stream and the base view video stream according to a stereoscopic display output by using the EV information and then transmits the same (step S2190).

In this manner, in the digital broadcast receiving apparatus according to the present exemplary embodiment, when the information regarding the EVV stream is provided through the EIT (Event Information Table) of the PSIP, the information regarding the EVV stream is checked and processed to output a stereoscopic image.

Selectively, the PSIP or PSI/SI processor 1820 may recognize PID information regarding the EVV stream by using the EV descriptor obtained from the EIT (namely, after step S2160) and then display broadcast guide information indicating whether or not a 3D broadcast is possible for each event to the user.

FIG. 22 is a view showing an example of configuring an EPG (Electronic Program Guide) informing about whether or not a broadcast program is broadcast in three-dimensional format by using the method of FIG. 21.

As shown in FIG. 22, when the EV descriptor is transmitted by means of the EIT, it becomes possible to perform signaling in a specific manner to indicate for each event as to whether or not 3D broadcast service is possible. Thus, a 2D broadcast and a 3D broadcast can be flexibly provided through a single virtual channel, and when the guide information regarding a broadcast program is provided, information regarding whether or not each a 3D broadcast is possible for each event and detailed 3D related parameters can be additionally provided.

In addition, when the content of the EV descriptor of a previously scheduled event is altered, the EV descriptor information (which has been previously obtained and stored when the EIT version was updated) is updated, thus maintaining the information of the EV descriptor related to the event as the latest information constantly.

Figure 23:
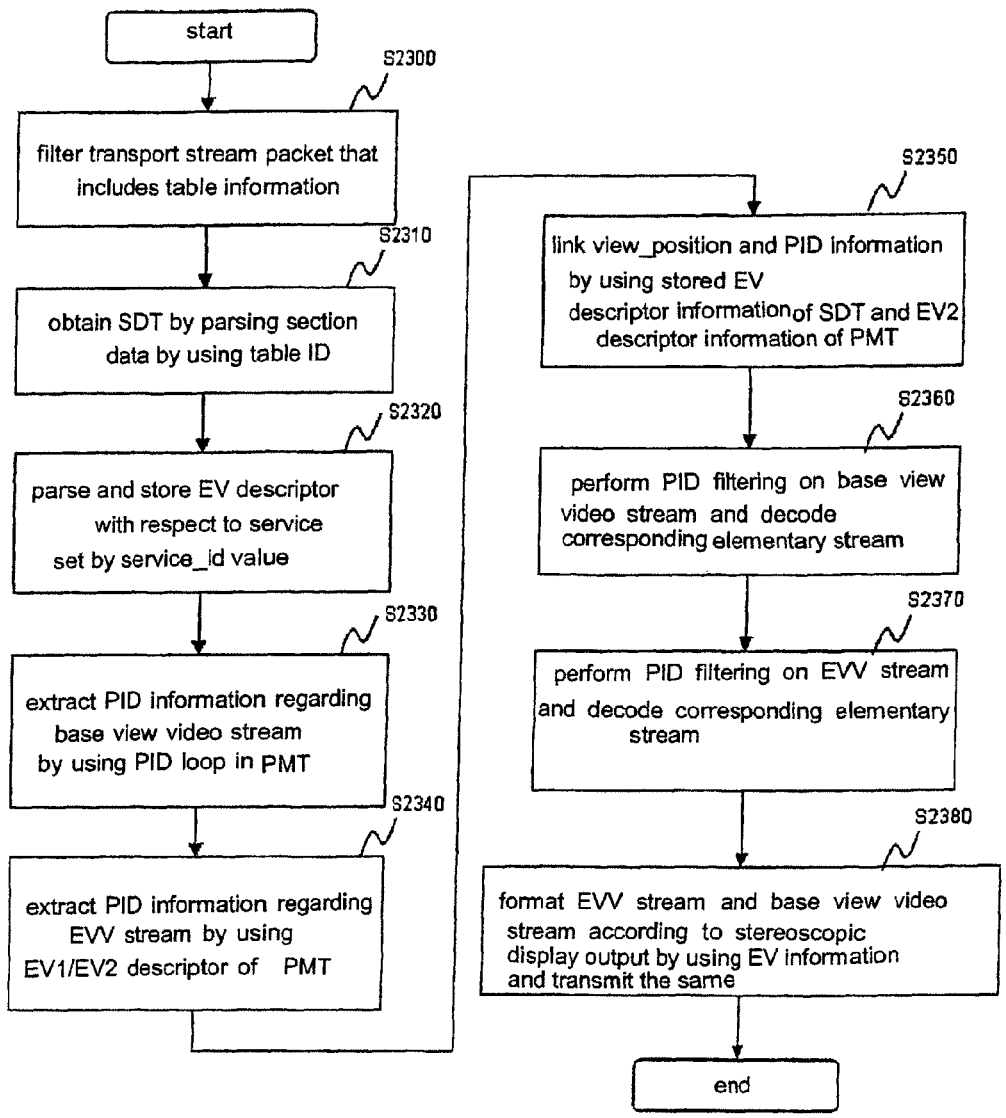
FIG. 23 is a flow chart illustrating the process of a method for checking and processing information regarding an EVV stream and outputting a stereoscopic image by a digital broadcast receiving apparatus when the information regarding the EVV is provided through the PMT (Program Map Table) of the PSI (Program and System Information) in the DVB type digital broadcast according to an exemplary embodiment of the present invention.

FIG. 23 is a flow chart illustrating the process of a method for checking and processing information regarding an EVV stream and outputting a stereoscopic image by a digital broadcast receiving apparatus when the information regarding the EVV is provided through the PMT (Program Map Table) of the PSI (Program and System Information) in the DVB type digital broadcast according to an exemplary embodiment of the present invention.

First, with respect to a transport stream output from the tuner unit 1800 the demultiplexing unit 1810 filters transport stream packets that include table information (step S2300).

The demultiplexing unit 1810 obtains an SDT by parsing section data by using table ID information (table_id) (step S2310).

The PSIP or PSI/SI processor 1820 parses the EV descriptor with respect to a service set by the "service_id" value of the SDT, and stores the same (step S2320).

Also, the PSIP or PSI/SI processor 1820 extracts PID information regarding the base view video stream by using a PID loop in the PMT (step S2330), and then extracts PID information regarding the EVV stream by using an EV1 descriptor and an EV2 descriptor included in the PMT (step S2340).

Thereafter, the PSIP or PSI/SI processor 1820 links view position information (view_position) and the PID information by using the EV descriptor information of the SDT and the EV2 descriptor information of the PMT which have been previously stored (step S2350). Here, as an example of the view position information, the "left_right_pos" field may be used in case of a stereoscopic image display.

And then, the demultiplexing unit 1810 performs PID filtering on the base view video stream by using the recognized PID information of the base view video stream, and the A/V decoder 1830 performs decoding on a corresponding elementary stream (step S2360).

Also, the demultiplexing unit 1810 performs PID filtering on the EVV stream by using the PID information regarding the recognized EVV stream, and the A/V decoder 1830 decodes a corresponding elementary stream (step S2370).

Thereafter, the output formatting unit 1840 formats the EVV stream and the base view video stream according to a stereoscopic display output by using the EV information, and then transmits the same (step S2380).

In this manner, in the digital broadcast receiving apparatus according to an exemplary embodiment of the present invention, when the information regarding the EVV stream is provided through the PMT (Program Map Table) of the PSI (Program Specific Information) in the DVB type digital broadcast, the information regarding the EVV stream is checked and processed to output a stereoscopic image.

Figure 24:
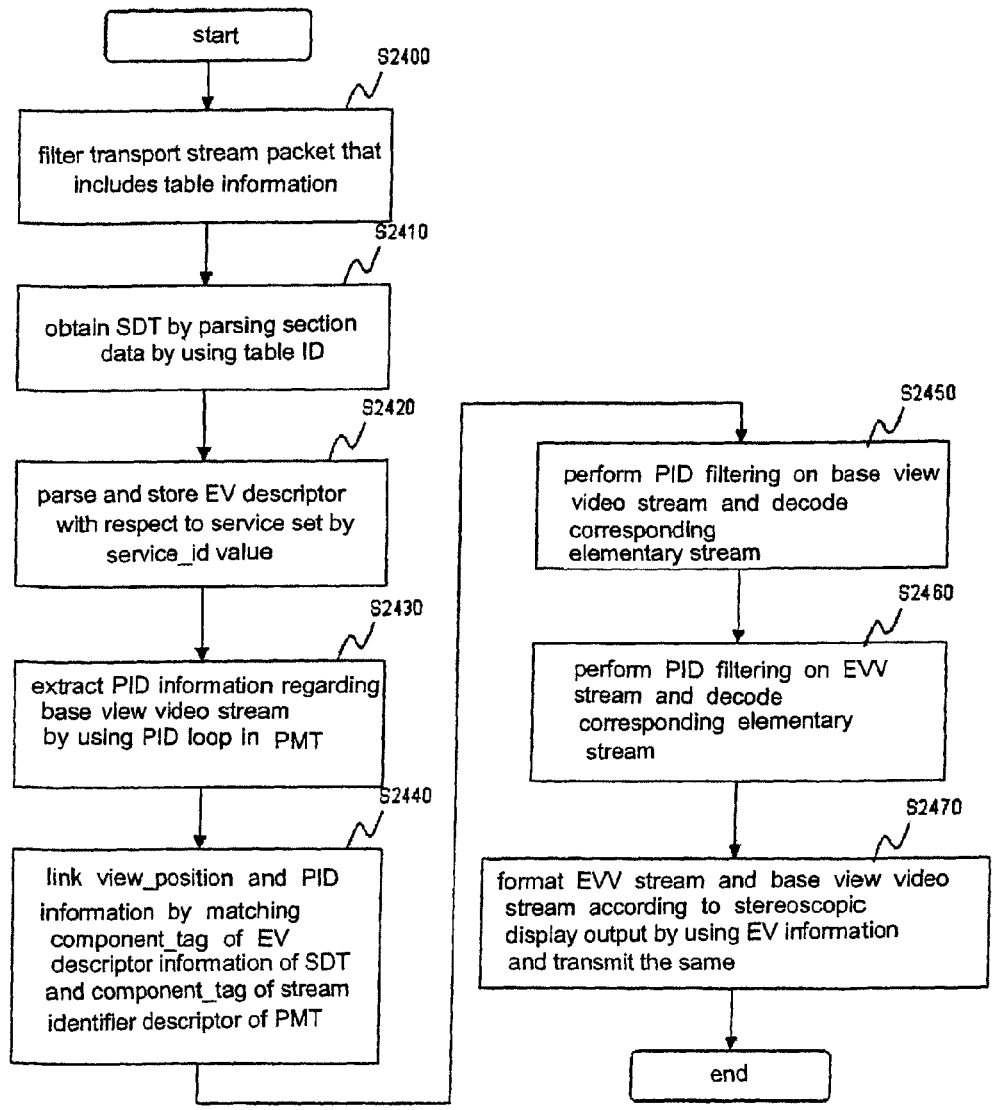
FIG. 24 is a flow chart illustrating the process of a method for checking and processing information regarding an EVV stream and outputting a stereoscopic image by a digital broadcast receiving apparatus when the information regarding the EVV is provided particularly by using a component tag in the method for providing information regarding the EVV stream through the SDT (Service Description Table) of the SI (Service Information) in the DVB type digital broadcast according to an exemplary embodiment of the present invention.

FIG. 24 is a flow chart illustrating the process of a method for checking and processing information regarding an EVV stream and outputting a stereoscopic image by a digital broadcast receiving apparatus when the information regarding the EVV is provided particularly by using a component tag in the method for providing information regarding the EVV stream through the SDT (Service Description Table) of the SI (Service Information) in the DVB type digital broadcast according to an exemplary embodiment of the present invention.

First, with respect to a transport stream output from the tuner unit 1800, the demultiplexing unit 1810 filters transport stream packets that include table information (step S2400).

The demultiplexing unit 1810 obtains an SDT by parsing section data by using table ID information (table_id) (step S2410).

The PSIP or PSI/SI processor 1820 parses the EV descriptor with respect to a service set by the "service_id" value of the SDT, and stores the same (step S2420).

Also, the PSIP or PSI/SI processor 1820 extracts PID information regarding the base view video stream by using a PID loop in the PMT (step S2430).

Thereafter, the PSIP or PSI/SI processor 1820 matches a component tag of the EV descriptor of the SDT which has been previously stored and a component tag of a stream identifier descriptor included in the PMT of the PSI to link the view position information (view_position) and the PID information (step S2440). Here, as an example of the view position information, the "left_right_pos" field may be used in case of a stereoscopic image display.

And then, the demultiplexing unit 1810 performs PID filtering on the base view video stream by using the recognized PID information of the base view video stream, and the A/V decoder 1830 performs decoding on a corresponding elementary stream (step S2450).

Also, the demultiplexing unit 1810 performs PID filtering on the EVV stream by using the PID information regarding the recognized EVV stream, and the A/V decoder 1830 decodes a corresponding elementary stream (step S2460).

Thereafter, the output formatting unit 1840 formats the EVV stream and the base view video stream according to a stereoscopic display output by using the EV information, and then transmits the same (step S2470).

In this manner, in the digital broadcast receiving apparatus according to an exemplary embodiment of the present invention, when the information regarding the EVV stream is provided particularly by using the component tag in the method for providing information regarding the EVV stream through the SDT (Service Description Table) of the SI (Service Information) in the DVB type digital broadcast, the information regarding the EVV stream is checked and processed to output a stereoscopic image.

Figure 25:
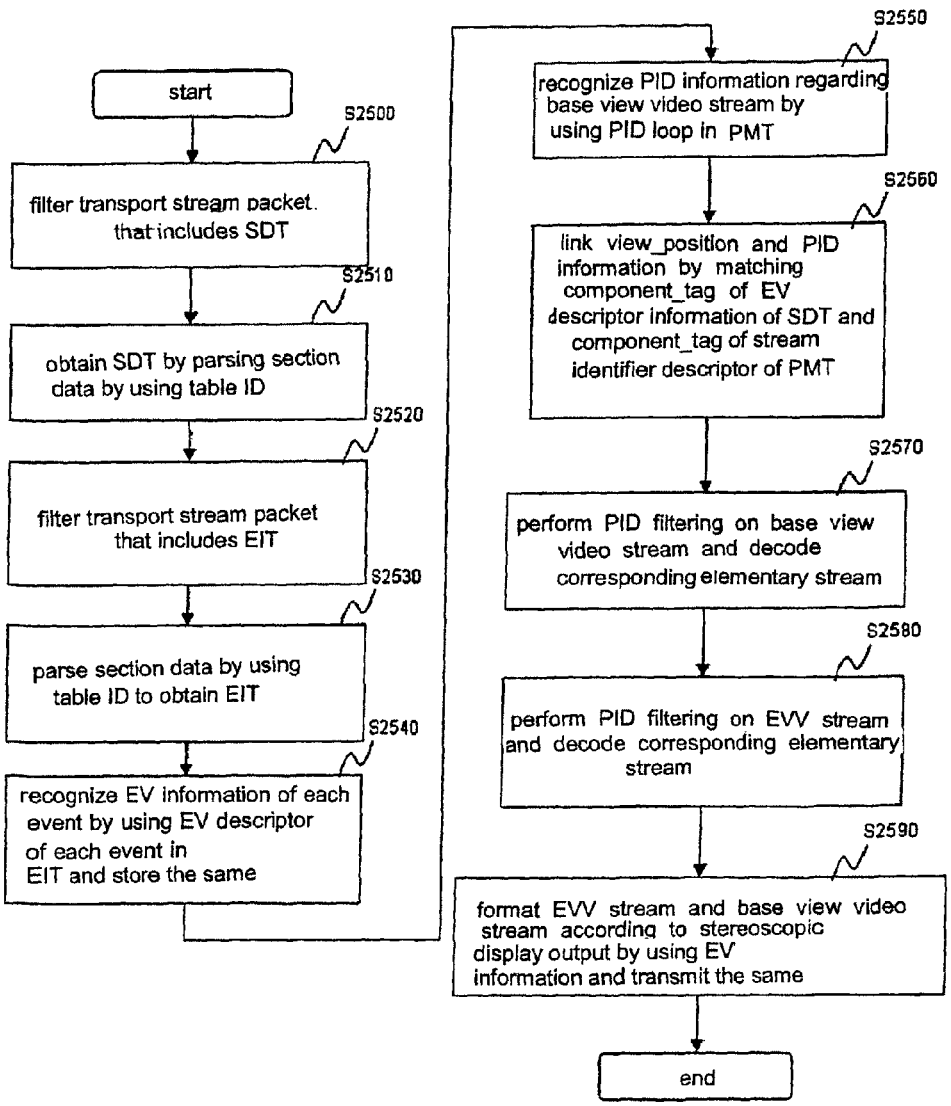
FIG. 25 is a flow chart illustrating the process of a method for checking and processing information regarding an EVV stream and outputting a stereoscopic image by a digital broadcast receiving apparatus when the information regarding the EVV is provided particularly by using a component tag in the method for providing information regarding the EVV stream through the EIT (Event Information Table) of the SI (Service Information) in the DVB type digital broadcast according to an exemplary embodiment of the present invention.

FIG. 25 is a flow chart illustrating the process of a method for checking and processing information regarding an EVV stream and outputting a stereoscopic image by a digital broadcast receiving apparatus when the information regarding the EVV is provided particularly by using a component tag in the method for providing information regarding the EVV stream through the EIT (Event Information Table) of the SI (Service Information) in the DVB type digital broadcast according to an exemplary embodiment of the present invention.

First, with respect to a transport stream output from the tuner unit 1800, the demultiplexing unit 1810 filters transport stream packets that include table information (step S2500). In this case, the PID of the transport stream packet that includes the SDT has been set to have a value of 0x0011.

The demultiplexing unit 1810 obtains an SDT by parsing section data by using table ID information (table_id) (step S2510).

The demultiplexing unit 1810 filters the transport stream packet that includes the EIT with respect to the transport stream (step S2520). In this case, the PID of the transport stream packet that includes the EIT is set to have a value of 0x0012.

The demultiplexing unit 1810 obtains the EIT by parsing section data by using table ID information (table_id) (step S2530).

The PSIP or PSI/SI processor 1820 recognizes EV information of each event by using an EV descriptor of each event in the EIT, and stores the same (step S2540).

Also, the PSIP or PSI/SI processor 1820 extracts PID information regarding the base view video stream by using a PID loop in the PMT (step S2550).

Thereafter, the PSIP or PSI/SI processor 1820 matches a component tag of the EV descriptor of the EIT which has been previously stored and a component tag of a stream identifier descriptor included in the PMT of the PSI to link the view position information (view_position) and the PID information (step S2560). Here, as an example of the view position information, the "left_right_pos" field may be used in case of a stereoscopic image display.

And then, the demultiplexing unit 1810 performs PID filtering on the base view video stream by using the recognized PID information of the base view video stream, and the A/V decoder 1830 performs decoding on a corresponding elementary stream (step S2570).

Also, the demultiplexing unit 1810 performs PID filtering on the EVV stream by using the PID information regarding the recognized EVV stream, and the A/V decoder 1830 decodes a corresponding elementary stream (step S2580).

Thereafter, the output formatting unit 1840 formats the EVV stream and the base view video stream according to a stereoscopic display output by using the EV information, and then transmits the same (step S2590).

In this manner, in the digital broadcast receiving apparatus according to an exemplary embodiment of the present invention, when the information regarding the EVV stream is provided particularly by using the component tag in the method for providing information regarding the EVV stream through the EIT (Event information Table) of the SI (Service Information) in the DVB type digital broadcast, the information regarding the EVV stream is checked and processed to output a stereoscopic image.

Selectively, the PSIP or PSI/SI processor 1820 may recognize EV information, information regarding the EVV stream of each event by using the EV descriptor of each event in the EIT (namely, after step S2540) and then display broadcast guide information indicating whether or not a 3D broadcast is possible for each event to the user.

In addition, when the content of the EV descriptor of a previously scheduled event is altered, the EV descriptor information which has been previously obtained and stored when the EIT version was updated is updated, thus maintaining the information of the EV descriptor related to the event as the latest information constantly.

As so far described, according to the digital broadcast receiving method and apparatus according to an exemplary embodiment of the present invention, information regarding a stereoscopic image can be provided in various manners in the digital broadcast, and also, since the stereoscopic image information can be checked and processed, a stereoscopic image display can be output.

Meanwhile, in a different exemplary embodiment, when a selection for changing a display direction of a stereoscopic image is input by the user, an EVV stream having location information corresponding to the changed display direction is selected to generate a stereoscopic image, thus changing the display direction of the stereoscopic image.

This will now be described with reference to FIG. 4. While a stereoscopic image is on display by using a video stream from the camera 1 of the base view and a video stream from the camera 2 of the extended view, a screen change in a leftward direction may be selected by the user.

When the selection of the change to the leftward direction of the stereoscopic image is input, the digital broadcast receiving apparatus according to an exemplary embodiment of the present invention changes the configuration of the video streams for forming the stereoscopic image to select the video stream from the camera 1 of the base view and an EVV stream from the camera 0, a video stream in the leftward direction, to generate a stereoscopic image.

In this manner, in the present exemplary embodiment, the display direction of the stereoscopic image can be changed according to the user's selection of the change in the direction.

Various embodiments have been described to explain original concepts related to various aspects of the present invention. However, one or more detailed features of a particular embodiment may be applicable to one or more other embodiments. Components or steps described in each embodiment and relevant drawings may be modified and supplementary components and/or steps may be deleted, moved, or included.

The various features and concepts described here can be implemented by software, hardware, firmware, middleware, or a combination thereof. For example, a computer program (which is executed by a computer, a processor, a controller, or the like) stored in a computer-executable medium to implement the method and apparatus for receiving a stereoscopic image signal in a digital broadcast may include one or more program code sections performing various operations. Similarly, software tools (which are executed by a computer, a processor, a controller, or the like) stored in a computer-executable medium to implement the method and apparatus for receiving a stereoscopic image signal in a digital broadcast may include part of program codes performing various operations.

The present invention can be applicable to various types of devices, namely, a digital TV, an LCD display device, a personal media player (PMP), a mobile phone, or the like, configured to receive and process a digital broadcast signal.

As the present invention may be embodied in several forms without departing from the spirit or essential characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method comprising:
receiving a base view video stream, an extended view video stream, a stream type field, and information regarding stereoscopic characteristics for supporting a 3D broadcast service,
wherein the base view video stream is 3D video component which is used for legacy 2D broadcast service and the extended view video stream is 3D video component added to the base view video stream to compose 3D video,
wherein the base view video stream and the extended view video stream are encoded using different codecs,
wherein said information regarding stereoscopic characteristics is indicated by one or more descriptors defined in Advanced Television Systems Committee ATSC Standard;
identifying the stream type field,
wherein a value of the stream type field indicates a type of codec for the extended view video stream and information as to whether a video stream related to said at least one of said one or more descriptors is the base view video stream or the extended view video stream;
identifying said one or more descriptors,
wherein said one or more descriptors are included in a Terrestrial Virtual Channel Table (TVCT) of a Program and System Information Protocol (PSIP) in ATSC type digital broadcast,
wherein for the 3D broadcast service in which the extended view video is encoded using a codec different from the base view video, at least one of said one or more descriptors includes a stream_info_details field for the extended view video stream; and
processing the base view video stream and the extended view video stream using said one or more descriptors.

2. The method of claim 1, wherein at least one of said one or more descriptors describes video components and has a value that indicates the type of codec for the extended view video stream.

3. The method of claim 1, wherein information related to a type of a service carried in a virtual channel is included in the TVCT.

4. The method of claim 2, wherein the extended view video stream is processed by using the type of codec for the extended view video stream to support the 3D broadcast service.

5. The method of claim 2, wherein said at least one of said one or more descriptors has a plurality of fields comprising a first field that indicates a value that indicates the type of codec for the extended view video stream and a second field that indicates further information related to the video stream.

6. The method of claim 5, wherein the value further indicates information as to whether a video stream related to said at least one of said one or more descriptors is the base view video stream or the extended view video stream.

7. The method of claim 5, wherein the first field indicates a stream type associated with a component described in an iteration of a for loop.

8. A method comprising:
encoding a base view video stream, an extended view video stream, a stream type field and information regarding stereoscopic characteristics for supporting a 3D broadcast service,
wherein the base view video stream is 3D video component which is used for legacy 2D broadcast service and the extended view video stream is 3D video component added to the base view video stream to compose 3D video,
wherein said information regarding stereoscopic characteristics is indicated by one or more descriptors defined in Advanced Television Systems Committee (ATSC) Standard, and
wherein said one or more descriptors are included in a Terrestrial Virtual Channel Table (TVCT) of a Program and System Information Protocol (PSIP) in ATSC type digital broadcast; and
wherein the base view video stream and the extended view video stream are encoded using different codecs,
wherein the stream type field indicates a type of codec for the extended view video stream and information as to whether a video stream related to said at least one of said one or more descriptors is the base view video stream or the extended view video stream, and
wherein for the 3D broadcast service in which the extended view video is encoded using a codec different from the base view video, at least one of said one or more descriptors includes a stream_info_details field for the extended view video stream;
transmitting, to a receiver, the base view video stream, the extended view video stream and said one or more descriptors such that the receiver employs said information regarding stereoscopic characteristics to support the 3D broadcast service.

9. The method of claim 8, wherein at least one of said one or more descriptors describes video components and has a value that indicates the type of codec for the extended view video stream.

10. The method of claim 9, wherein the extended view video stream is processed by using the type of codec for the extended view video stream to support the 3D broadcast service.

11. The method of claim 9, wherein said at least one of said one or more descriptors has a plurality of fields comprising a first field that indicates the value that indicates the type of codec for the extended view video stream and a second field that indicates further information related to the video stream.

12. The method of claim 11, wherein the value further indicates information as to whether a video stream related to said at least one of said one or more descriptors is the base view video stream or the extended view video stream.

13. The method of claim 11, wherein the first field indicates a stream type associated with a component described in an iteration of a for loop.

14. An apparatus comprising:
a receiving unit for receiving a base view video stream, an extended view video stream, a stream type field, and information regarding stereoscopic characteristics for supporting a 3D broadcast service,
wherein the base view video stream is 3D video component which is used for legacy 2D broadcast service and the extended view video stream is 3D video component added to the base view video stream to compose 3D video,
wherein the base view video stream and the extended view video stream are encoded using different codecs,
wherein said information regarding stereoscopic characteristics is indicated by one or more descriptors defined in Advanced Television Systems Committee ATSC Standard;
an identifying unit for identifying the stream type field and said one or more descriptors, wherein a value of the stream type field indicates a type of codec for the extended view video stream and information as to whether a video stream related to said at least one of said one or more descriptors is the base view video stream or the extended view video stream, wherein said one or more descriptors are included in a Terrestrial Virtual Channel Table (TVCT) of a Program and System Information Protocol (PSIP) in ATSC type digital broadcast, wherein for the 3D broadcast service in which the extended view video is encoded using a codec different from the base view video, at least one of said one or more descriptors includes a stream_info_details field for the extended view video stream; and a processing unit for processing the base view video stream and the extended view video stream using said one or more descriptors.

15. The apparatus of claim 14, wherein at least one of said one or more descriptors describes video components and has a value that indicates the type of codec for the extended view video stream.

16. The apparatus of claim 15, wherein the additional view video stream is processed by using the type of codec for the extended view video stream to support the 3D broadcast service.

17. An apparatus comprising:

an encoding unit for encoding a base view video stream, an extended view video stream, a stream type field, and information regarding stereoscopic characteristics for supporting a 3D broadcast service, wherein the base view video stream is 3D video component which is used for legacy 2D broadcast service and the extended view video stream is 3D video component added to the base view video stream to compose 3D video, wherein said information regarding stereoscopic characteristics is indicated by one or more descriptors defined in Advanced Television Systems Committee (ATSC) Standard, and wherein said one or more descriptors are included in a Terrestrial Virtual Channel Table (TVCT) of a Program and System Information Protocol (PSIP) in ATSC type digital broadcast; and wherein the base view video stream and the extended view video stream are encoded using different codecs, wherein the stream type field indicates a type of codec for the extended view video stream and information as to whether a video stream related to said at least one of said one or more descriptors is the base view video stream or the extended view video stream, and wherein for the 3D broadcast service in which the extended view video is encoded using a codec different from the base view video, at least one of said one or more descriptors includes a stream_info_details field for the extended view video stream; and a transmitting unit for transmitting, to the receiver, the base view video stream, the extended view video stream and said one or more descriptors such that the receiver employs said information regarding stereoscopic characteristics to support the 3D broadcast service.

18. The method of claim 17, wherein at least one of said one or more descriptors describes video components and has a value that indicates the type of codec for the extended view video stream.

19. The method of claim 18, wherein the extended view video stream is processed by using the type of codec for the extended view video stream to support the 3D broadcast service.

* * * * *